US012225370B2

(12) United States Patent
Jang et al.

(10) Patent No.: US 12,225,370 B2
(45) Date of Patent: Feb. 11, 2025

(54) APPARATUS FOR IMMERSIVE SPATIAL AUDIO MODELING AND RENDERING

(71) Applicant: Electronics and Telecommunications Research Institute, Daejeon (KR)

(72) Inventors: Dae Young Jang, Daejeon (KR); Kyeongok Kang, Daejeon (KR); Jae-hyoun Yoo, Daejeon (KR); Yong Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 204 days.

(21) Appl. No.: 18/096,439

(22) Filed: Jan. 12, 2023

(65) Prior Publication Data

US 2023/0224668 A1 Jul. 13, 2023

(30) Foreign Application Priority Data

Jan. 13, 2022 (KR) ........................ 10-2022-0005545
Nov. 28, 2022 (KR) ........................ 10-2022-0161448

(51) Int. Cl.
*H04S 7/00* (2006.01)
*G10L 19/008* (2013.01)

(52) U.S. Cl.
CPC ............ *H04S 7/304* (2013.01); *G10L 19/008* (2013.01); *H04S 7/305* (2013.01); *H04S 2400/13* (2013.01); *H04S 2420/01* (2013.01)

(58) Field of Classification Search
CPC ...... H04S 7/304; H04S 7/305; H04S 2400/13; H04S 2420/01; G10L 19/008; G10K 15/08
See application file for complete search history.

(56) References Cited

U.S. PATENT DOCUMENTS

| | | | | |
|---|---|---|---|---|
| 10,204,630 | B2 | 2/2019 | Lee et al. | |
| 2015/0156578 | A1* | 6/2015 | Alexandridis | H04R 3/005 381/92 |
| 2020/0107147 | A1* | 4/2020 | Munoz | H04S 3/008 |
| 2021/0289308 | A1* | 9/2021 | Laaksonen | H04N 21/43074 |
| 2022/0014869 | A1* | 1/2022 | Lee | G10L 19/008 |
| 2022/0022000 | A1* | 1/2022 | Bruhn | H04S 7/304 |
| 2022/0115024 | A1* | 4/2022 | Pihlajakuja | G10L 19/008 |
| 2024/0249732 | A1* | 7/2024 | Dick | G10L 19/02 |

FOREIGN PATENT DOCUMENTS

| | | | |
|---|---|---|---|
| KR | 10-2019-0125371 | 11/2019 | |
| VN | 10036696 B * | 8/2023 | G10L 19/0017 |
| WO | 2019/012135 | 1/2019 | |
| WO | 2019/199046 | 10/2019 | |
| WO | WO-2019199046 A1 * | 10/2019 | G10L 19/00 |

* cited by examiner

*Primary Examiner* — Oyesola C Ojo

(74) *Attorney, Agent, or Firm* — KILE PARK REED & HOUTTEMAN PLLC

(57) ABSTRACT

Disclosed is an apparatus for immersive spatial audio modeling and rendering for effectively transmitting and playing immersive spatial audio content. The apparatus for immersive spatial audio modeling and rendering disclosed herein may model a spatial audio scene, generate and transmit parameters necessary for spatial audio rendering, and generate various spatial audio effects using the spatial audio parameters, to provide an immersive three-dimensional (3D) audio source coinciding with visual experience in a virtual reality space in response to free changes in the position and direction of a remote user in the space.

16 Claims, 17 Drawing Sheets

100

```
<!-- Define a mesh -->
<Mesh id="room_surface">
  <Vertex index="0" position="1 2 3" />
  <Vertex index="1" position="0.2 -1 0" />
  <Vertex index="2" position="2 2 1" />
  <Vertex index="3" position="1 0.5 -0.1" />
  ...

  <Face index="0" vertices="0 1 2" />
  <Face index="1" vertices="0 2 3" />
  ...
</Mesh>
```

APPARATUS FOR IMMERSIVE SPATIAL AUDIO MODELING AND RENDERING

CROSS-REFERENCE TO RELATED APPLICATION

This application claims the benefit of Korean Patent Application No. 10-2022-0005545 filed on Jan. 13, 2022, and Korean Patent Application No. 10-2022-0161448 filed on Nov. 28, 2022, in the Korean Intellectual Property Office, the entire disclosures of which are incorporated herein by reference for all purposes.

BACKGROUND

1. Field of the Invention

The disclosure relates to the field of audio signal processing technology.

2. Description of the Related Art

Three-dimensional (3D) audio collectively refers to a series of technologies such as signal processing, transmission, encoding, and reproduction for providing immersive sounds in a 3D space in which a height and a direction are added to a sound on a (two-dimensional (2D)) horizontal plane provided by conventional audio. Recently, immersion is significant in a virtual reality (VR) space reproduced using head-mounted display (HMD) devices, and thus, the need for 3D audio rendering technology is emphasized. In particular, when real-time interactions between a user and multiple objects are important as in the VR space, a realistic audio scene that complexly reflects characteristics of audio objects needs to be reproduced to increase the immersion of the user in the virtual space. Reproduction of a virtual audio scene with reality may require a large amount of audio data and metadata to represent various audio objects. Providing content by a single download or in a form pre-stored in a medium is not an issue. However, providing media or content in the form of online streaming may have limits in transmitting required information on restricted bandwidth. To this end, a method of more effectively transmitting and processing content is demanded.

SUMMARY

The present disclosure is intended to provide an apparatus for immersive spatial audio modeling and rendering for effectively transmitting and playing immersive spatial audio content.

The technical goal obtainable from the present disclosure is not limited to the above-mentioned technical goal, and other unmentioned technical goals may be clearly understood from the following description by those having ordinary skill in the technical field to which the present disclosure pertains.

According to an aspect, there is provided an apparatus for immersive spatial audio modeling and rendering. The apparatus may include an acoustical space model representation unit configured to output a spatial audio model in response to receiving a visual space model and a spatial audio parameter, a spatial audio modeling unit configured to analyze a spatial audio scene and output a spatial audio parameter in response to receiving the spatial audio model from the acoustical space model representation unit, a spatial audio codec unit configured to generate a bitstream by encoding an audio source required for spatial audio rendering and the spatial audio parameter output from the spatial audio modeling unit and then transmit the generated bitstream, and perform a function of reconstructing the audio source and the spatial audio parameter by receiving and parsing the transmitted bitstream so as to render a spatial audio in real time, a spatial audio processing unit configured to synthesize and output a room impulse response (RIR) by generating a direct sound, an early reflection, and a late reverberation according to an audio transfer pathway in response to receiving information on a position of a listener and the spatial audio parameter received from the spatial audio codec unit, and a spatial audio reproduction unit configured to generate a spatial audio at the position of the listener and then reproduce the generated spatial audio in response to receiving the information on the position of the listener and the RIR from the spatial audio processing unit.

In an embodiment, the acoustical space model representation unit may include a space model simplification block, and the space model simplification block may be configured to output an acoustical space model having a simple structure obtained by extracting only forms that produce an auditorily significant audio effect in response to the visual space model.

In an embodiment, the space model simplification block may include a space model hierarchical analysis unit (SMHAU) configured to perform a function of constructing a binary space partitioning (BSP) tree by hierarchically analyzing geometric data constituting a space model, a space model simplification unit (SMSU) configured to simplify a space model to a level required for producing an acoustical effect based on the BSP tree, and an acoustical space model generation unit (ASMGU) configured to represent a mesh of the simplified space model with units of triangular faces.

In an embodiment, the acoustical space model representation unit may further include a spatial audio model generation block, and the spatial audio model generation block may be configured to, in response to receiving the spatial audio parameter, compose an entire scene of spatial audio content and generate and output the spatial audio model.

In an embodiment, the spatial audio modeling unit may include a hierarchical space model block configured to hierarchically analyze a structure of an acoustical space model of the spatial audio model, an audio transfer pathway model block configured to extract a parameter of an occlusion on an audio pathway between an audio source and a listener and a parameter of an early reflection, in an acoustical space model of the spatial audio model, a late reverberation model block configured to classify a region that uses the same late reverberation model based on the acoustical space model of the spatial audio model, and extract parameters representing energy of a late reverberation and an attenuation slope, and a spatial audio effect model block configured to extract a parameter for a spatial audio effect model required for six degrees of freedom (6DoF) spatial audio rendering.

In an embodiment, the audio transfer pathway model block may include an occlusion modeling unit (OMU) configured to perform a function of defining an occlusion for an effect in which a direct sound of an audio source is indirectly transferred by the occlusion, and an early reflection modeling unit (ERMU) configured to generate a parameter for modeling primary or up to secondary early reflection from an audio source to a listener.

In an embodiment, the late reverberation model block may include a late reverberation area analysis unit (LRAAU) configured to define a classified area for a renderer to generate a late reverberation component according to the position of the listener, and a late reverberation parameter extraction unit (LRPEU) configured to extract a parameter necessary for generating a late reverberation.

In an embodiment, the spatial audio effect model block may include a Doppler parameter extraction unit (DPEU) configured to extract a parameter for implementing a pitch shift phenomenon according to a velocity of an audio source, and a volume source parameter extraction unit (VSPEU) configured to transfer, for an audio source having a shape, geometric information of the shape as a parameter.

In an embodiment, the DPEU may be further configured to, when movement properties of the audio source are preset, set a parameter regarding whether to process a Doppler effect by a maximum velocity value, and apply a Doppler effect in advance for an audio source that is far or invisible from a region to which the listener can move.

In an embodiment, the spatial audio codec unit may include a spatial audio metadata encoding block configured to quantize spatial audio metadata and pack the quantized spatial audio metadata in a metadata bitstream, an audio source encoding block configured to compress and encode an audio source, a muxing block configured to construct a multiplexed bitstream by multiplexing the encoded spatial audio metadata output from the spatial audio metadata encoding block and the bitstream of the audio source output from the audio source encoding block, and a decoding block configured to receive the multiplexed bitstream and perform demultiplexing and decoding thereon to reconstruct and output the spatial audio metadata and the audio source.

In an embodiment, the spatial audio processing unit may include a spatial audio effect processing block configured to process a spatial audio effect required for 6DoF spatial audio rendering, an early pathway generation block configured to extract an early RIR according to an early pathway between an audio source and the listener, and a late reverberation generation block configured to generate a late reverberation according to the position of the listener using parameters for late reverberation generation.

In an embodiment, the spatial audio effect processing block may include a Doppler effect processing unit (DEPU) configured to process a Doppler effect by a pitch shift by compression and expansion of a sound wave by a moving audio source, and a volume source effect processing unit (VSEPU) configured to perform rendering by applying an effect of a volume source in which all energy is focused on one point and an audio source has a volume and includes multiple audio sources therein, or in which a single audio source is provided and mapped to a shape having a volume, or in which a radiation pattern of an audio source has a different directional pattern for each frequency band.

In an embodiment, the early pathway generation block may include an occlusion effect processing unit (OEPU) configured to search for an occlusion in an occlusion structure transmitted as a bitstream on a pathway between a direct sound or an image source and the listener, apply, when an occlusion is present, a transmission loss by the occlusion, and perform, when a close diffraction pathway is present, a function of extracting two audio source transfer paths according to an audio source transfer loss by the diffraction pathway and the transmission loss and the diffraction pathway and a direction and a level of a new virtual audio source according to the transferred energy, and an early reflection generation unit (ERGU) configured to generate an image source by a structure, transmitted as a bitstream, causing specular reflection and extract a delay and a gain according to an early reflection pathway and a reflectance.

In an embodiment, the late reverberation generation block may include a late reverberation parameter generation unit (LRPGU) configured to generate a late reverberation from predelay, RT60, and DDR provided as a bitstream, and a late reverberation region decision unit (LRRDU) configured to search to determine a region to which a current position of a listener belongs based on range information of a region to which a late reverberation parameter transmitted as a bitstream is to be applied.

In an embodiment, the spatial audio reproduction unit may be further configured to play the generated spatial audio through headphones or output the generated spatial audio through a speaker through multi-channel rendering.

In an embodiment, the spatial audio reproduction unit may include a binaural room impulse response (BRIR) filter block configured to apply a binaural filter and an RIR filter according to the direction of the audio source of the direct sound and the delay and attenuation values of the early reflection/late reverberation extracted by the early pathway generation block and the late reverberation generation block of the spatial audio processing unit, a multi-channel rendering block configured to generate a channel signal in the form of a predetermined channel through which an audio source to be played through a multi-channel speaker is to be played, and a multi-audio mixing block configured to classify and control a binaurally rendered audio source and a multi-channel rendered audio source to be output through headphones or a speaker.

Additional aspects of example embodiments will be set forth in part in the description which follows and, in part, will be apparent from the description, or may be learned by practice of the disclosure.

According to embodiments, a technical effect of effectively transmitting and playing immersive spatial audio content may be produced.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
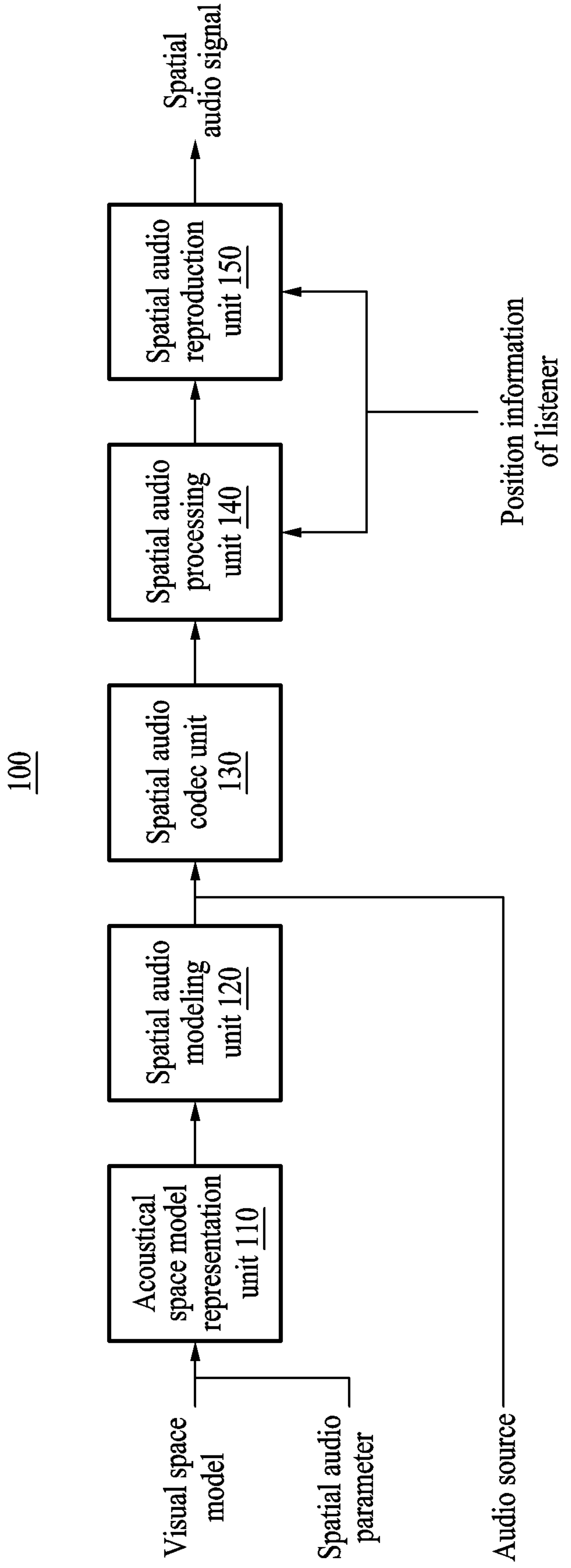
FIG. 1 is a block diagram of an embodiment of an apparatus for immersive spatial audio modeling and rendering according to the present disclosure.

The following detailed structural or functional description is provided as an example only and various alterations and modifications may be made to the embodiments. Here, the embodiments are not construed as limited to the disclosure and should be understood to include all changes, equivalents, and replacements within the idea and the technical scope of the disclosure.

Terms, such as "first", "second", and the like, may be used herein to describe components. Each of these terminologies is not used to define an essence, order or sequence of a corresponding component but used merely to distinguish the corresponding component from other component(s). For example, a "first" component may be referred to as a "second" component, or similarly, and the "second" component may be referred to as the "first" component within the scope of the right according to the concept of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which examples belong. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

The present disclosure relates to an apparatus for immersive spatial audio modeling and rendering that may effectively transmit and play immersive spatial audio content. The apparatus for immersive spatial audio modeling and rendering disclosed herein may model a spatial audio scene, generate and transmit parameters necessary for spatial audio rendering, and generate various spatial audio effects using the spatial audio parameters, to provide an immersive three-dimensional (3D) audio source coinciding with visual experience in a virtual reality space in response to free changes in the position and direction of a remote user in the space. Recently, MPEG-I proceeds with standardization of immersive media technology for immersive media services, and WG6 is in the procedure of evaluation of the technical proposals for standardization of bitstream and rendering technology for immersive audio rendering. The present disclosure describes an apparatus for immersive spatial audio modeling and rendering to cope with the MEPG-I proposal on immersive audio technology. The apparatus for immersive spatial audio modeling and rendering according to the present disclosure may estimate and generate a directional transfer function, that is, a directional room impulse response (DRIR), between multiple audio sources and a moving listener for spatial audio reproduction from a geometric model of a real space or a virtually generated space, and play with realism an audio source including an object audio source, multiple channels, and a scene audio source based on a current space model and a listening position. The apparatus for immersive spatial audio modeling and rendering according to the present disclosure may implement a spatial audio modeling function of generating metadata necessary for estimating a propagation pathway of an audio source based on a space model including an architecture of a provided space and the position and movement information of the audio source, and a spatial audio rendering function of rendering an audio source of a spatial audio by extracting a DRIR based on a real-time propagation pathway of the audio source based on the real-time position and direction of a listener. The propagation pathway of the audio source may be generated based on interactions with geometric objects in the space, such as reflection, transmission, diffraction, and scattering. Although accurate estimation of the propagation pathway determines the performance, it is important to enable real-time processing in a provided environment by optimizing the propagation pathway according to the spatial audio perception characteristics of humans at the demands of a renderer needing to operate in real time.

FIG. 1 is a block diagram of an embodiment of an apparatus for immersive spatial audio modeling and rendering according to the present disclosure.

As shown in FIG. 1, an apparatus 100 for immersive spatial audio modeling and rendering may include a spatial audio codec unit 130 including a transmission medium. The apparatus 100 may include functional units connected to a front end of the spatial audio codec unit 130 to implement a spatial audio modeling function and functional units connected to a rear end of the spatial audio codec unit 130 to implement a spatial audio rendering function. As shown, the functional units configured to implement the spatial audio modeling function may include an acoustical space model representation unit 110 and a spatial audio modeling unit 120, and the functional units configured to implement the spatial audio rendering function may include a spatial audio processing unit 140 and a spatial audio reproduction unit 150.

The acoustical space model representation unit 110 may be configured to output a spatial audio model by performing a space model simplification function and a spatial audio model generation function in response to receiving a visual space model and a spatial audio parameter. The visual space model input to the acoustical space model representation unit 110 may be a model for representing a visual structure of a space where a spatial audio is played. In an embodiment, the visual space model may represent complex spatial structure information converted from a computer-aided design (CAD) drawing or directly measured point cloud data. The spatial audio parameter input to the acoustical space model representation unit 110 may be a parameter necessary for spatial audio rendering. In an embodiment, the spatial audio parameter may indicate spatial information of an audio source and an audio object, material properties of an audio object, update information of a moving audio source, and the like. The spatial audio model output from the acoustical space model representation unit 110 may be an acoustically analyzable space model including essential information necessary for spatial audio modeling. In an embodiment, the spatial audio model may be spatial structure information simplified through the space model simplification function.

Figure 2:
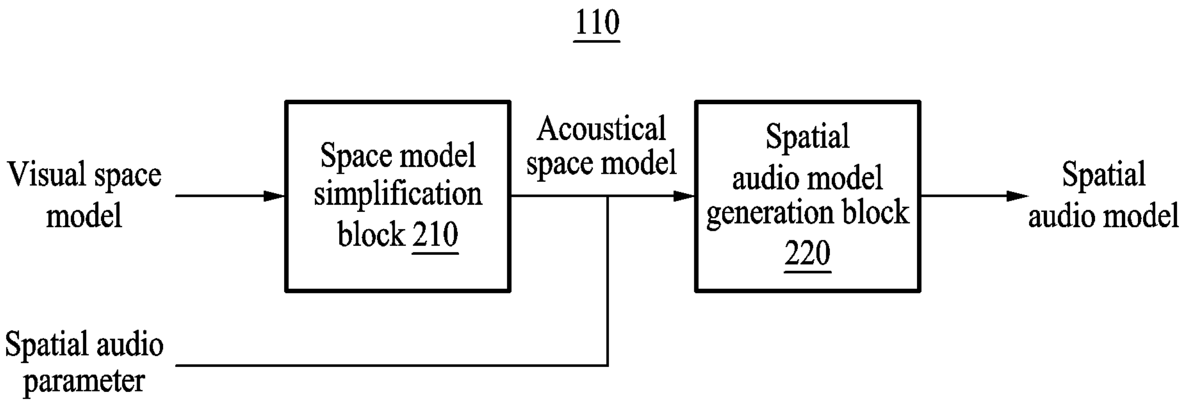
FIG. 2 is a block diagram of an acoustical space model representation unit of FIG. 1.

FIG. 2 is a block diagram of an acoustical space model representation unit of FIG. 1.

Figure 3:
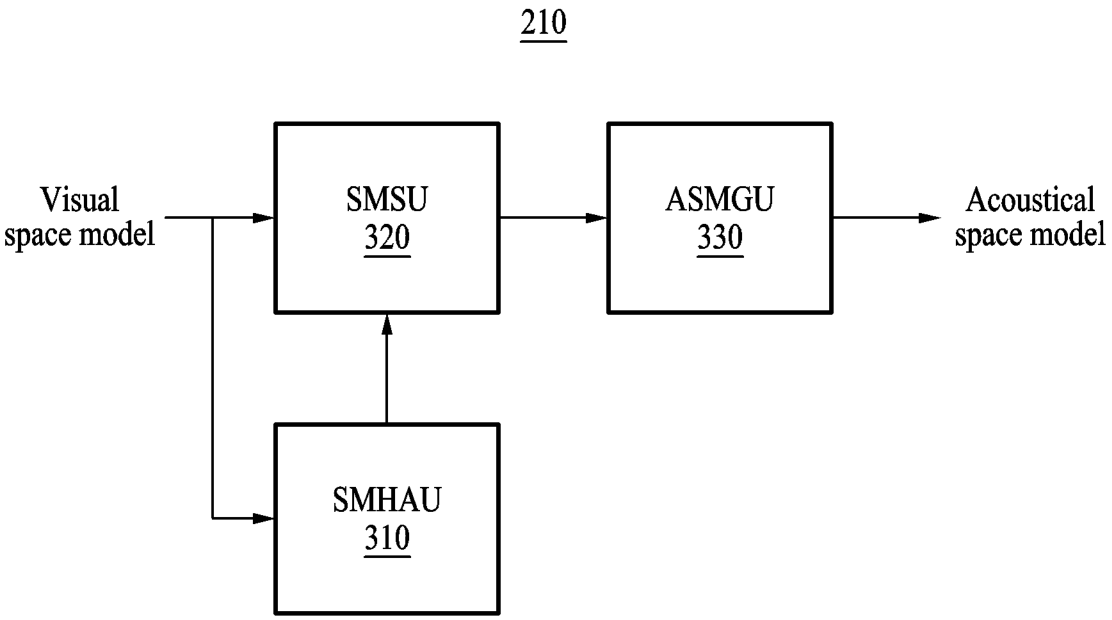
FIG. 3 is a block diagram of a space model simplification block of FIG. 2.
Figure 4A:
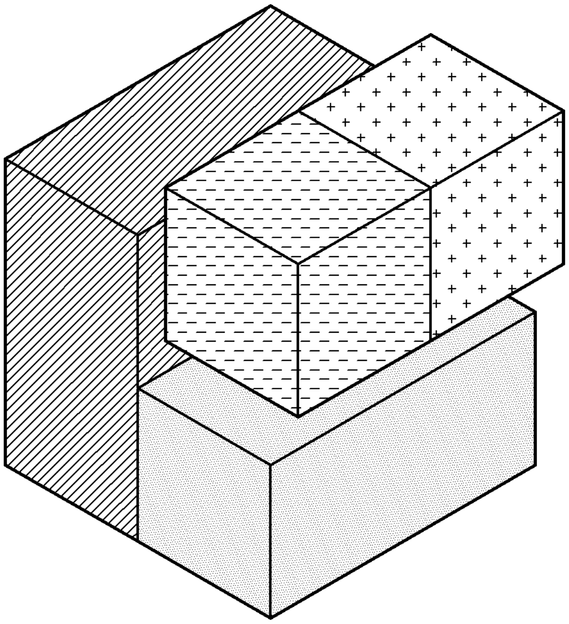
FIG. 4A is a diagram illustrating an example of analyzing a space model by a binary space partitioning (BSP) tree.
Figure 4B:
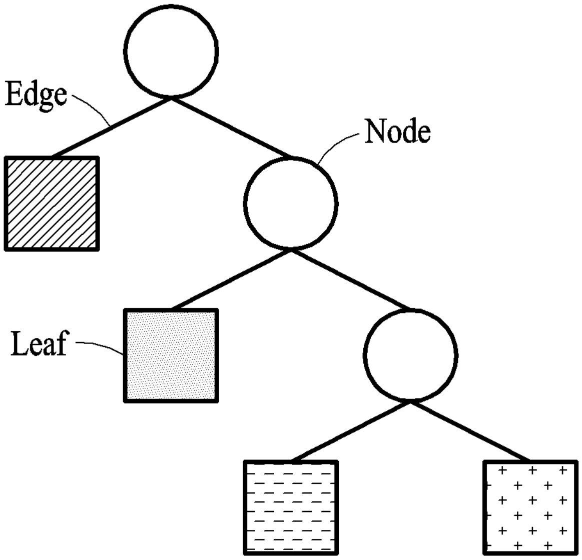
FIG. 4B is a diagram illustrating an example of constructing a BSP tree according to a space classified in FIG. 4A.
Figure 5:
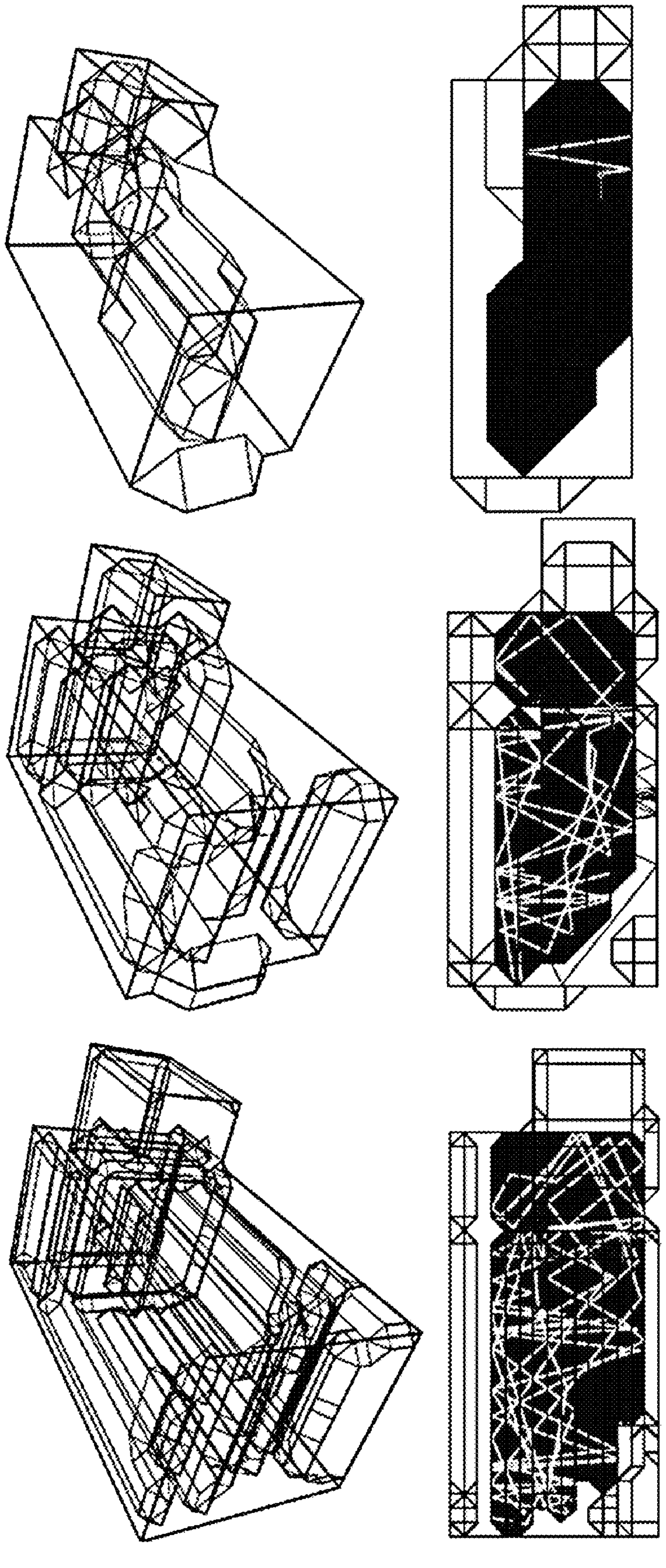
FIG. 5 is a diagram illustrating an example of space model changes according to a space model simplification level.
Figure 6:
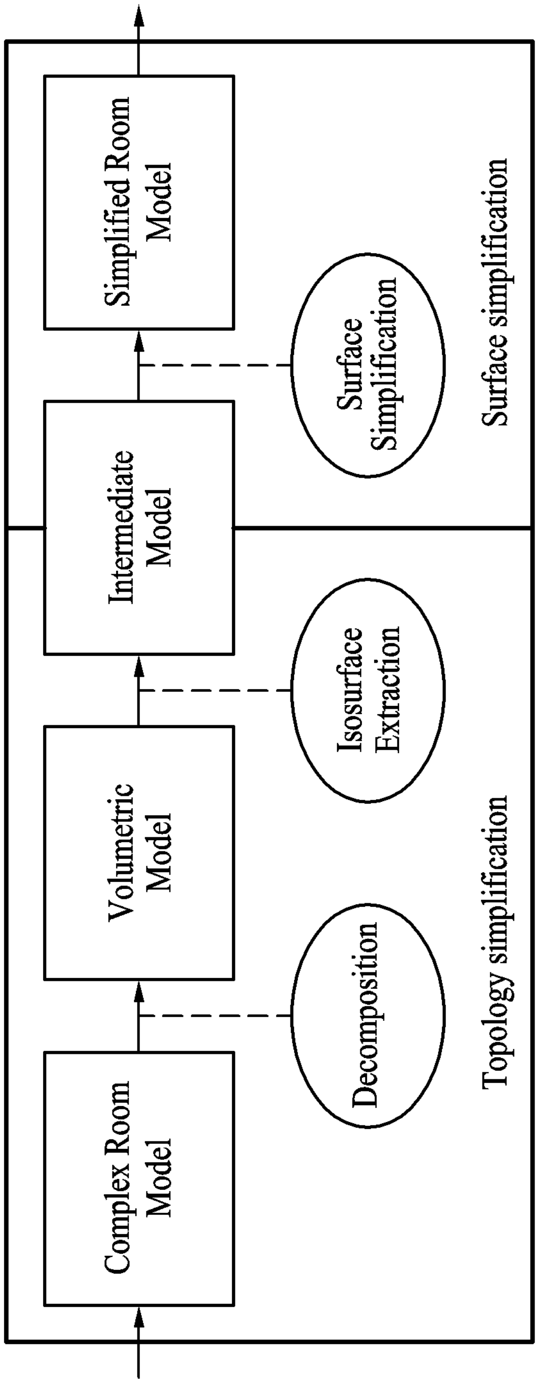
FIG. 6 is a diagram illustrating an example of space model simplification operations.
Figures 7, 8:
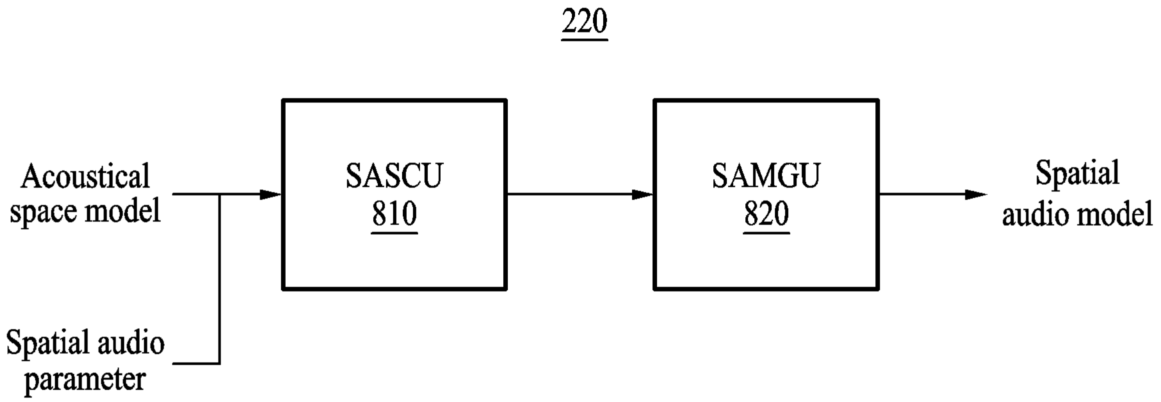
FIG. 7 is a diagram illustrating an example of extensible markup language (XML) representation used in the encoder input format (EIF) standard for encoder input of MPEG-I Immersive Audio.
FIG. 8 is a block diagram of a spatial audio model generation block of FIG. 2.

As shown in FIG. 2, the acoustical space model representation unit 110 may include a space model simplification block 210. The space model simplification block 210 may be configured to output an acoustical space model having a simple structure obtained by extracting only forms that produce an auditorily significant audio effect in response to a visual space model that is a precise space model similar to the real world. Referring to FIG. 3, which is a detailed block diagram of the space model simplification block 210 of FIG. 2, the space model simplification block 210 may include a space model hierarchical analysis unit (SMHAU) 310, a space model simplification unit (SMSU) 320, and an acoustical space model generation unit (ASMGU) 330. The SMHAU 310 may be configured to perform a function of hierarchically analyzing geometric data that configures a space model, that is, a mesh structure constructed with a basic structure of a box, spherical, or cylindrical shape and a combination of triangles. Although there are various methods of hierarchically analyzing a space model, such as bounding volume hierarchies (BVH), Octree, and binary space partitioning (BSP), BSP may be used in an embodiment. A space model analyzed by BSP may efficiently classify and search for an area using binary search. FIG. 4A is a diagram illustrating an example of analyzing a space model by a BSP tree, and FIG. 4B is a diagram illustrating an example of constructing a BSP tree according to a space classified in FIG. 4A. The SMSU 320 may be a module configured to simplify a space model to a level required for producing an acoustical effect based on a BSP tree constructed by the SMHAU 310. The resolution of a space model may be simplified according to the frequency resolution of spatial audio characteristics to be reproduced through spatial audio analysis, and the simplification may be performed by limiting the minimum size of geometric data that mainly configures the space and eliminating or integrating portions having a size less than or equal to the minimum size. As shown in FIG. 5, which illustrates an example of space model changes according to a space model simplification level, the space model may be simplified through limitation to the size of the constituent elements of the space model with respect to the length of the minimum period of a sound wave according to an effective frequency band of an audio effect. Space model simplification may be implemented by operations as shown in FIG. 6. Referring to FIG. 6, which illustrates an example of space model simplification operations, space model simplification may be performed by performing a topology simplification operation and a surface simplification operation. In the topology simplification operation, a very precise original space model may be input, wherein a space model decomposed through a space model analysis (decomposition of FIG. 6) by the SMHAU may be represented as a BSP tree, and portions such as small grooves, gaps, points, and the like may be eliminated by limiting the depth of the BSP tree. In the following procedure, an intermediate model may be generated by the marching cubes algorithm through isosurface extraction. In the surface simplification operation, surfaces on the same plane may be fused using the geometric optimization algorithm proposed by Hinker and Hansen, through which sharp corner portions may be removed. The ASMGU 330 may be configured to represent a mesh of the simplified space model with units of triangular faces. The ASMGU 330 may operate to generate a list of coordinates of all vertices with indices together and to generate a list of faces constructed with three vertex indices. Referring to FIG. 7, which illustrates an example of extensible markup language (XML) representation used in the encoder input format (EIF) standard for encoder input of MPEG-I Immersive Audio that is currently in the process of standardization, a vertex may have vertex coordinates along with an index, and a triangular face may have indices of vertices constituting the face along with an index. Here, the arrangement order of vertices may determine the direction of a front face, that is, an outer face, and the front face of three vertex vectors may be determined to be the direction of a normal vector.

Referring back to FIG. 2, the acoustical space model representation unit 110 may further include a spatial audio model generation block 220. The spatial audio model generation block 220 may be configured to receive an acoustical space model which is a simplified space model and a spatial audio parameter including the position, shape, and directionality information of an audio source representing a spatial audio scene, movement and interaction information of each object, characteristic information of an audio material, and the like, compose an entire scene of spatial audio content, and generate and output a spatial audio model for data exchange with the spatial audio modeling unit. Referring to FIG. 8, which is a detailed block diagram of the spatial audio model generation block 220, the spatial audio model generation block 220 may include a spatial audio scene composition unit (SASCU) 810 and a spatial audio model generation unit (SAMGU) 820. The SASCU 810 may be configured to compose a spatial audio scene classified by an audio source model configured by the positions, shapes, and radiation patterns, that is, directivities, of various audio sources included in the acoustical space model, an audio field model including the acoustical space model and audio material characteristics of each face, or a scene update model including dynamic characteristics of the spatial audio scene, that is, temporal movement or event movement information by interactions, thereby completing all constituent elements included in single spatial audio content. The SAMGU 820 may be configured to generate the spatial audio scene composed by the SASCU 810 in a standard format such as an XML document according to the standards for commonly exchanging spatial audio scene model data in an application as in MPEG-I Immersive Audio EIF. The spatial audio model output from the SAMGU 820 may include metadata for a spatial audio content service, and may be utilized in the form of original spatial audio content to distribute spatial audio content together with an audio source in a single package.

Figure 9:
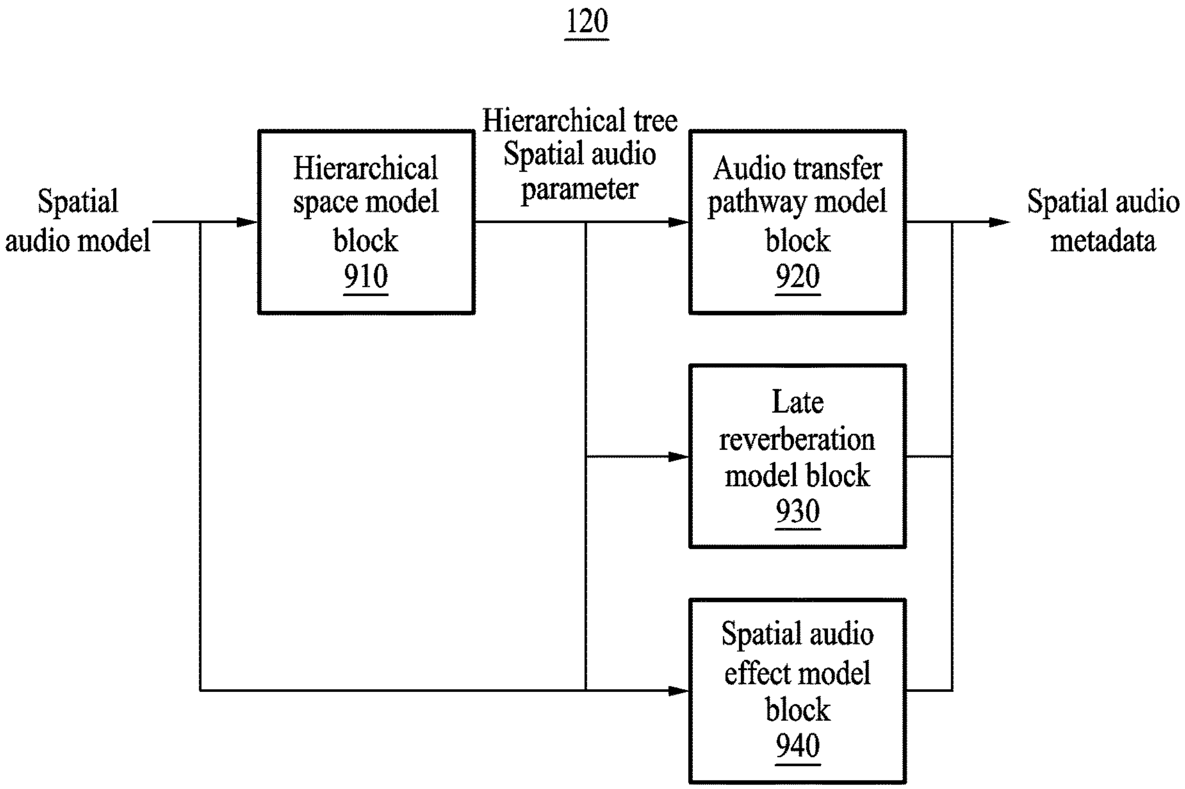
FIG. 9 is a block diagram of a spatial audio modeling unit of FIG. 1.

Referring back to FIG. 1, the spatial audio modeling unit 120 may be configured to analyze a spatial audio scene and consequently output a spatial audio parameter in response to receiving the spatial audio model from the acoustical space model representation unit 110. As shown in FIG. 9, which is a detailed block diagram of the spatial audio modeling unit 120, the spatial audio modeling unit 120 may include a hierarchical space model block 910, an audio transfer pathway model block 920, a late reverberation model block 930, and a spatial audio effect model block 940. The spatial audio model input to the hierarchical space model block 910, the audio transfer pathway model block 920, the late reverberation model block 930, and the spatial audio effect model block 940 may be an acoustically analyzable space model including essential information necessary for spatial audio modeling, and may include spatial structure information simplified through a space model simplification function. The spatial audio metadata output from the audio transfer pathway model block 920, the late reverberation model block 930, and the spatial audio effect model block 940 may be metadata necessary for processing spatial audio rendering, that is, audio transfer pathway generation, late reverberation generation, and spatial audio effects, and may be a dataset that configures a bitstream.

Figure 10:
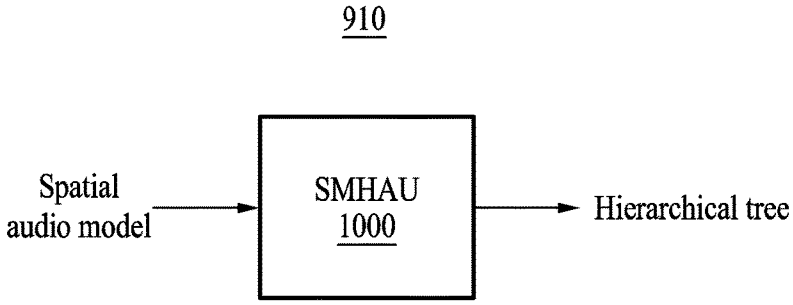
FIG. 10 is a block diagram of a hierarchical space model block of FIG. 9.

The hierarchical space model block 910 may be configured to hierarchically analyze a structure of an acoustical space model of the spatial audio model. In an embodiment, the hierarchical space model block 910 may be configured to perform the same function as the SMHAU 310 of FIG. 3. As shown in FIG. 10, which is a detailed block diagram of the hierarchical space model block 910, the hierarchical space model block 910 may include a SMHAU 1000. As described above, the SMHAU 1000 may be configured to perform the same function as the SMHAU 310, and may be configured to generate a BSP tree in a structure for effectively performing spatial audio modeling in response to the acoustical space model included in the spatial audio model, instead of a visual space model.

Figure 11:
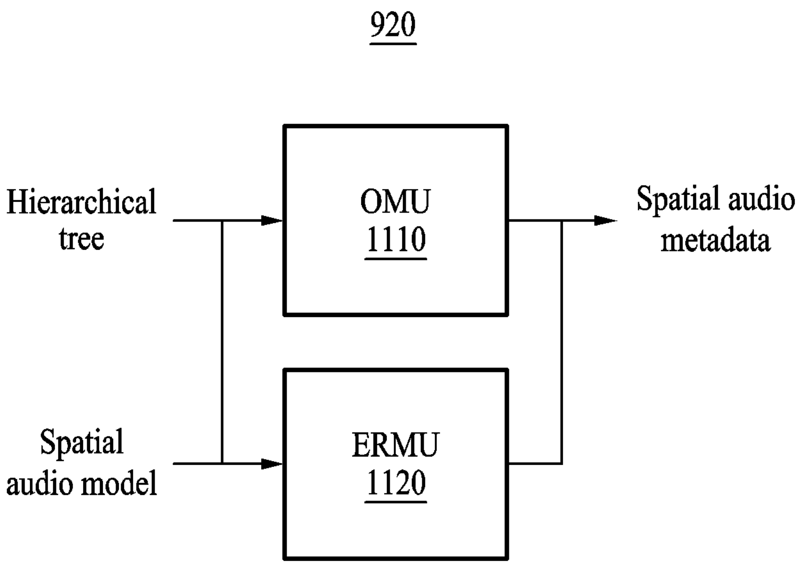
FIG. 11 is a block diagram of an audio transfer pathway model block of FIG. 9.
Figure 12:
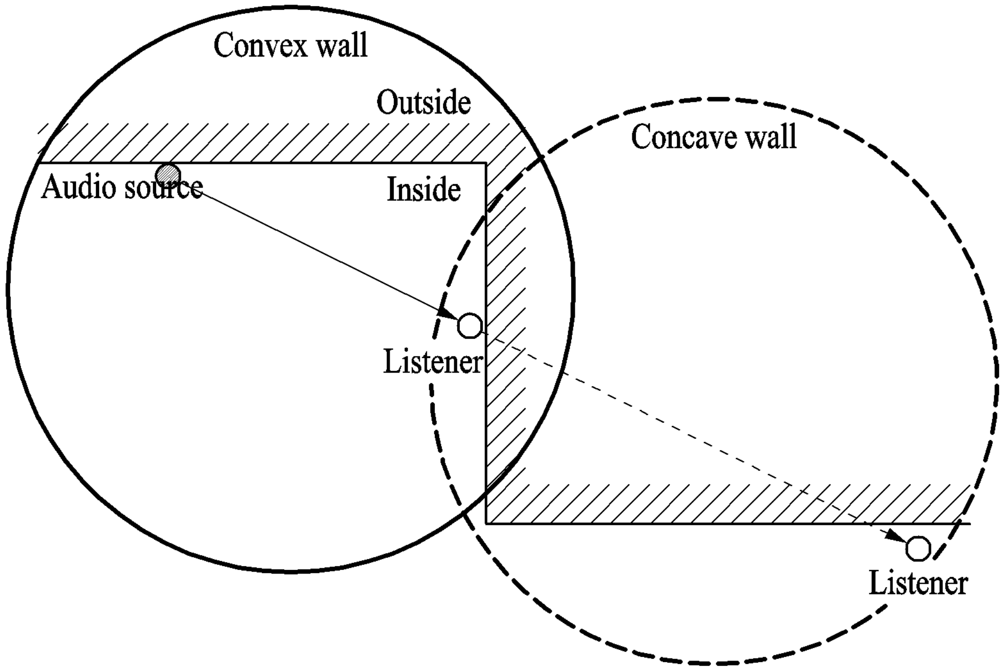
FIG. 12 is a diagram illustrating an example of determining a convex/concave shape for occlusion search.

The audio transfer pathway model block 920 may be configured to extract a parameter of an occlusion on an audio pathway between an audio source and a listener and a parameter of an early reflection, in the acoustical space model of the spatial audio model. Referring to FIG. 11, which is a detailed block diagram of the audio transfer pathway model block 920, the audio transfer pathway model block 920 may include an occlusion modeling unit (OMU) 1110 and an early reflection modeling unit (ERMU) 1120. The OMU 1110 may perform a function of defining an occlusion for an effect in which a direct sound of an audio source is indirectly transferred by the occlusion. An occlusion structure may be searched from the acoustical space model of the spatial audio model, and only essential information may be separately classified as an occlusion structure. When transmittance information of a material necessary for implementing an occlusion effect and a diffraction pathway are provided, diffraction position information may be generated as a parameter, and relative coordinates may be used for a movable occlusion such that a renderer may perform occlusion application with respect to an occlusion having moved. As shown in FIG. 12, which illustrates an example of determining a convex/concave shape for occlusion search, an occlusion structure should be a concave wall, which may be determined through the direction of a vector formed by two walls and the normal direction. The occlusion structure found as described above may be optimized according to limiting criteria such as size, thickness, height, transmittance, and the like, and may also be optimized according to a moving range of a listener predetermined by a creator. The ERMU 1120 may be configured to generate a parameter for modeling primary or up to secondary early reflection from an audio source to a listener. A parameter representing the structure of a wall, a floor, or a ceiling where early reflection may occur may be basic information. In addition, reflectance information for extracting the level of reflection should be included. If all walls are closed, it may be simply represented as a box form. When a bitstream is configured on a frame-by-frame basis, since all audio sources are fixed in one frame, an image source is crucial for a fixed wall structure and thus, may be calculated in advance and transmitted. The renderer may perform occlusion determination for each image source, and if an occlusion is absent, regard a reflection pathway as being valid and apply a delay and a reflectance to the pathway between the image source and a listener.

Figure 13:
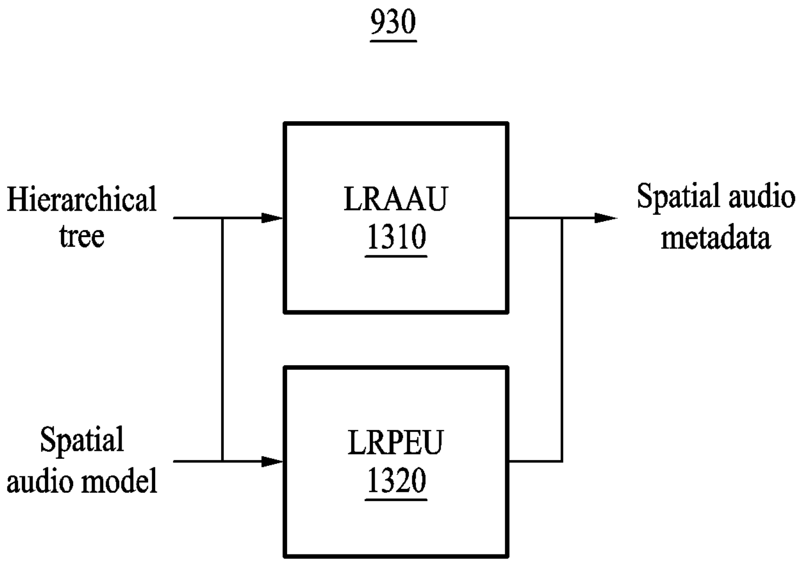
FIG. 13 is a block diagram of a late reverberation model block of FIG. 9.

The late reverberation model block 930 may be configured to classify a region that uses the same late reverberation model based on the acoustical space model of the spatial audio model, and extract parameters representing energy of a late reverberation and an attenuation slope. Referring to FIG. 13, which is a detailed block diagram of the late reverberation model block 930, the late reverberation model block 930 may include a late reverberation area analysis unit (LRAAU) 1310 and a late reverberation parameter extraction unit (LRPEU) 1320. The LRAAU 1310 may function to define a classified area for the renderer to generate a late reverberation component according to a position of a listener. The LRAAU 1310 may be configured to represent a structure of a space, pre-defined by the creator, in which a late reverberation is clearly classified. In expressing the structure of a reverberation area, it is effective to basically use a box-shaped structure to minimize calculations in the renderer, and a wall surface in a complex structure may be divided into multiple boxes to simulate an approximate shape. The LRPEU 1320 may be configured to extract a parameter necessary for generating a late reverberation. In an embodiment, the parameter necessary for generating a late reverberation may include a parameter such as Reverberation Time 60 dB (RT60), Direct to Diffuse Ratio (DDR), or predelay prescribed in the EIF of MPEG-I Immersive Audio. If prescribed in advance by a content producer in the EIF, the value may be transmitted as it is. RT60 refers to the time attenuated by 60 dB from a direct sound, and DDR refers to the energy ratio of a late reverberation component to a direct sound and is defined for each sub-band. Predelay specifies the start time of a late reverberation component.

Figure 14:
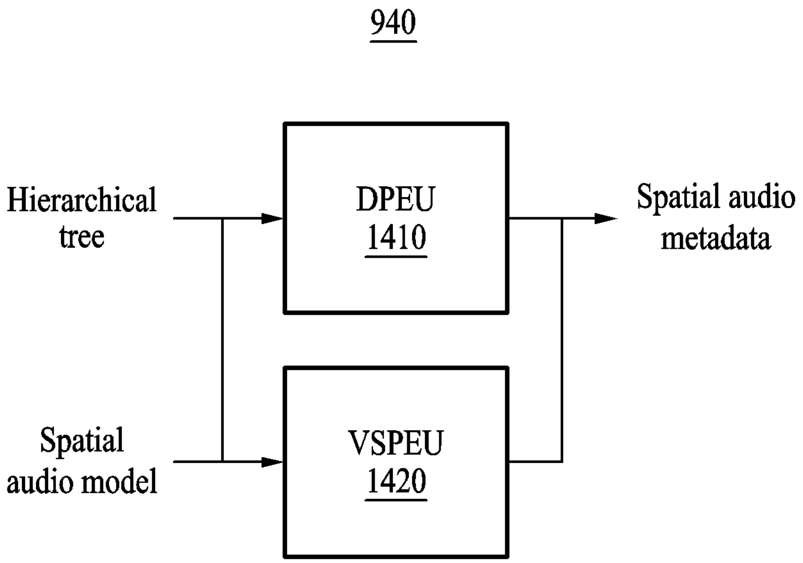
FIG. 14 is a block diagram of a spatial audio effect model block of FIG. 9.
Figure 15:
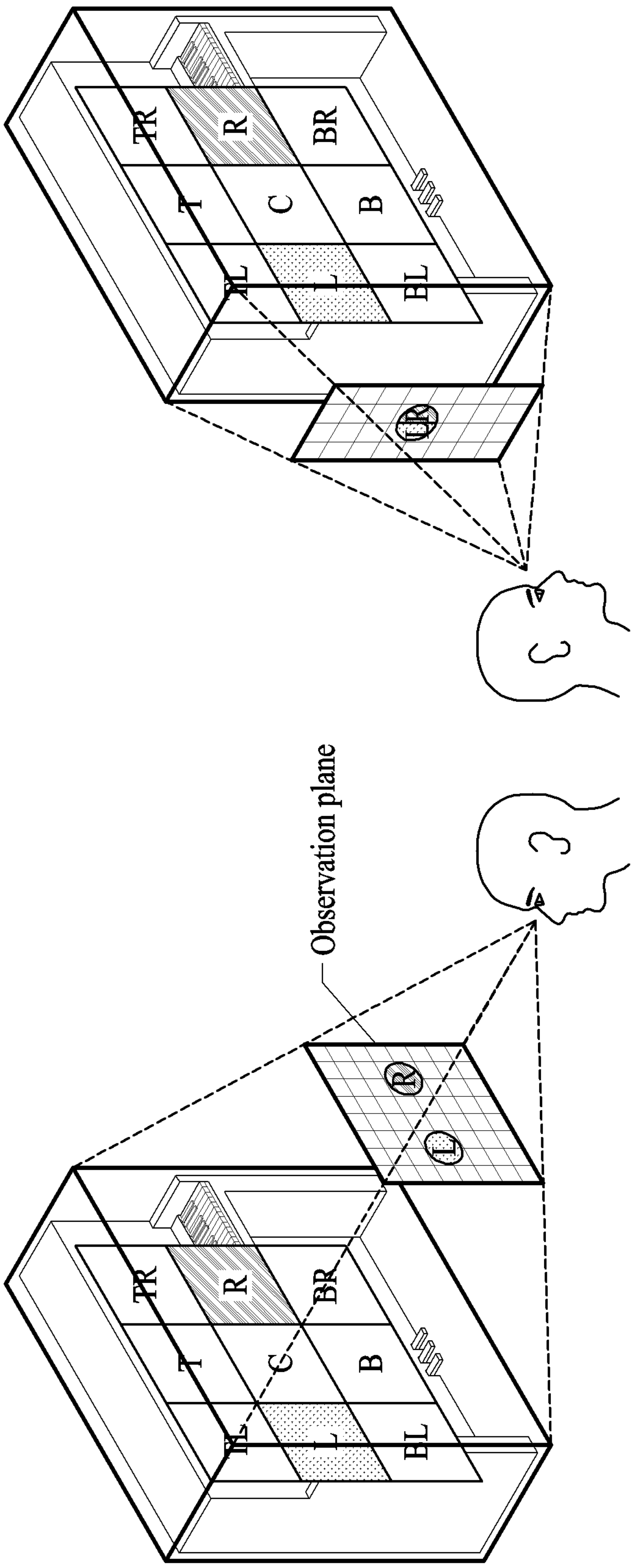
FIG. 15 is a diagram illustrating a method of object alignment prescribed in MPEG-I Immersive Audio EIF and a method of mapping an audio source according to a position of a user.

The spatial audio effect model block 940 may be a block for extracting a parameter for a spatial audio effect model necessary for six degrees of freedom (6DOF) spatial audio rendering, and may be configured to extract a parameter for representing a volume source having a shape and a Doppler effect according to a velocity of an audio source that moves. Referring to FIG. 14, which is a detailed block diagram of the spatial audio effect model block 940, the spatial audio effect model block 940 may include a doppler parameter extraction unit (DPEU) 1410 and a volume source parameter extraction unit (VSPEU) 1420. The DPEU 1410 may be configured to extract a parameter for implementing a pitch shift phenomenon according to a velocity of an audio source. When movement properties such as the velocity and the direction of the audio source are preset, the DPEU 1410 may set a parameter regarding whether to process a Doppler effect by a value such as a maximum velocity. The DPEU 1410 may be configured to apply a Doppler effect in advance for an audio source that is far or invisible from a region to which the listener can move, and accordingly, the renderer may not process the Doppler effect. In the case of applying a structure for transmission on a frame-by-frame basis, the parameter may be changed and set for each frame. The VSPEU 1420 may be a unit configured to transmit, for an audio source having a shape, geometric information of the shape as a parameter, so that the renderer may implement energy and a diffusion effect through changes in the shape and size of the audio source according to a relative position with the listener. Although it is effective when an audio source has a simple shape such as a box shape or a spherical shape, the shape of an audio source may be represented by a combination of such basic shapes or a simple mesh combination. It is possible to map multiple audio sources to a volume source, and each audio source may be mapped by object alignment which maps a fixed audio source to an object, and user alignment which maps an audio source to a viewpoint of a listener. FIG. 15 is a diagram illustrating a method of object alignment prescribed in MPEG-I Immersive Audio EIF and a method of mapping an audio source according to a position of a user. Still another volume source representation method may represent a volume source with a single point audio source and a directional pattern radiating in each direction, which may use directional pattern information provided by the creator based on pre-measured data. In MPEG-I Immersive Audio, directionality information is provided as a spatially oriented format for audio (SOFA) file. A volume source having the shape described above may have a characteristic that transferred audio energy changes in proportion to the size of a volume viewed according to the position of a user, and may be converted into gain information of a required direction, that is, directional pattern information, using this characteristic. In addition, a directional pattern may include an overly large number of directions according to the resolution of a direction of measurement. Only directionality information of a required direction may be transmitted according to required movements of a user and movements of a volume source, or the amount of data to be transmitted to the renderer may be reduced by changing the resolution of the direction by a directionality discrimination limit for human directional audio sources.

Figure 16:
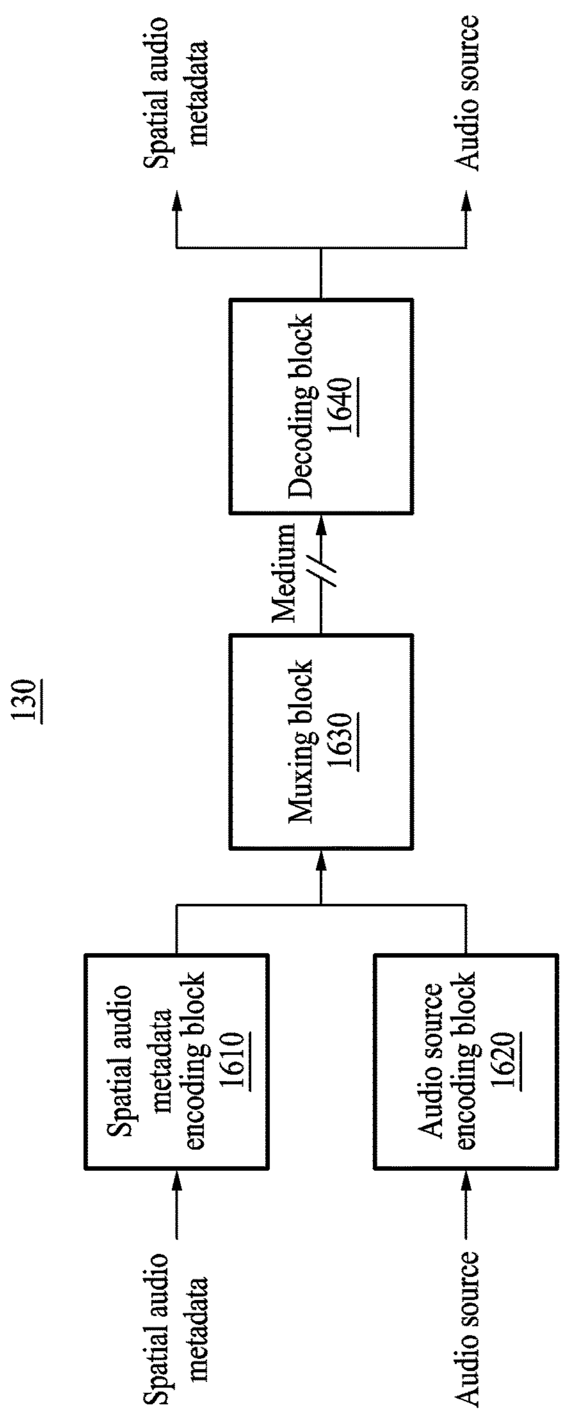
FIG. 16 is a block diagram of a spatial audio codec unit of FIG. 1.

Referring back to FIG. 1, the spatial audio codec unit 130 may be configured to generate a bitstream by encoding an audio source required for spatial audio rendering and the spatial audio parameter (relevant metadata) output from the spatial audio modeling unit 120 and then transmit the generated bitstream, and perform a function of reconstructing the audio source and the spatial audio parameter by receiving and parsing the transmitted bitstream so as to render a spatial audio in real time. Referring to FIG. 16, which is a detailed block diagram of the spatial audio codec unit 130, the spatial audio codec unit 130 may include a spatial audio metadata encoding block 1610, an audio source encoding block 1620, a muxing block 1630, and a decoding block 1640. Spatial audio metadata input to the spatial audio metadata encoding block 1610 may be metadata necessary for processing spatial audio rendering, that is, audio transfer pathway generation, late reverberation generation, and spatial audio effects, and may be a dataset that configures a bitstream. An audio source input to the audio source encoding block 1620 may include original data of all audio sources included in spatial audio content. Spatial audio metadata output from the decoding block 1640 may be metadata necessary for processing spatial audio rendering, that is, audio transfer pathway generation, late reverberation generation, and spatial audio effects, and may be a dataset reconstructed from the bitstream. An audio source output from the decoding block 1640 may include all frame-based audio sources that are reconstructed from the bitstream and have passed through the encoding and decoding process.

Figure 17:
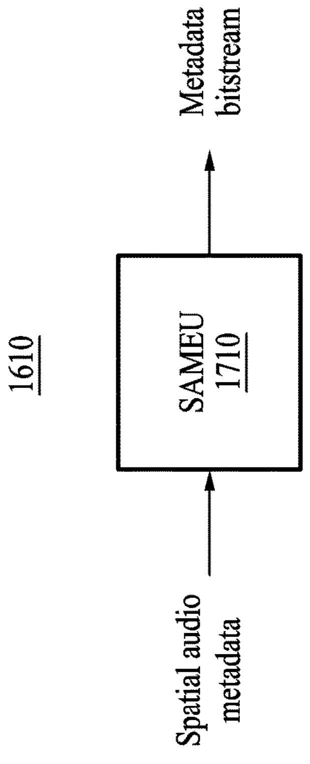
FIG. 17 is a block diagram of a spatial audio metadata encoding block of FIG. 16.

The spatial audio metadata encoding block 1610 may be configured to quantize metadata required for spatial audio rendering and pack the quantized metadata in a metadata bitstream. Referring to FIG. 17, which is a detailed block diagram of the spatial audio metadata encoding block 1610, the spatial audio metadata encoding block 1610 may include a spatial audio metadata encoding unit (SAMEU) 1710. The SAMEU 1710 may be a unit configured to configure a bitstream by structuring, quantizing, and packing metadata necessary for each rendering function so that the renderer may render a spatial audio. In an embodiment, such metadata may include temporally predetermined movement information of an audio source, and other necessary space model information and metadata, in addition to metadata such as spatial information for the occlusion effect processing and early reflection described above, metadata for late reverberation synthesis, metadata for processing the Doppler effect, metadata for representing the directionality of a volume source and an audio source.

Figure 18:
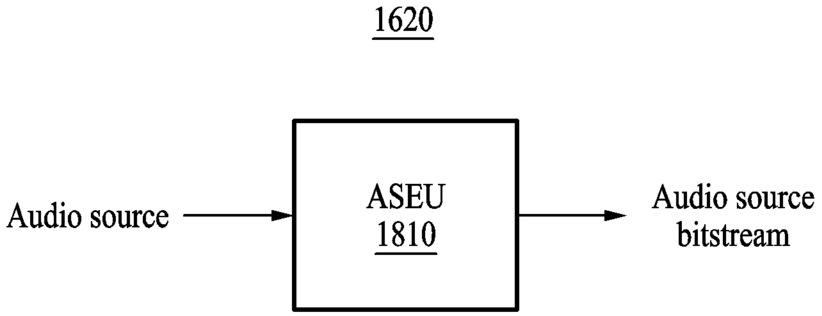
FIG. 18 is a block diagram of an audio source encoding block of FIG. 16.

The audio source encoding block 1620 may be configured to compress and encode all audio sources required for spatial audio rendering. Referring to FIG. 18, which is a detailed block diagram of the audio source encoding block 1620, the audio source encoding block 1620 may include an audio source encoding unit (ASEU) 1810. The ASEU 1810 may be configured to encode data of all audio sources necessary for spatial audio rendering, that is, an object audio source, a channel-based audio source, and a scene-based audio source. In the MPEG-I Immersive Audio standardization, it was determined to configure the ASEU 1810 by applying the MPEG-H 3D Audio LC profile technology. In the MPEG-I Immersive Audio standardization phase, an evaluation platform uses audio sources encoded and decoded offline and allows a renderer to use the same. Thus, the ASEU 1810 may be regarded as a structure that is included only conceptually.

Figure 19:
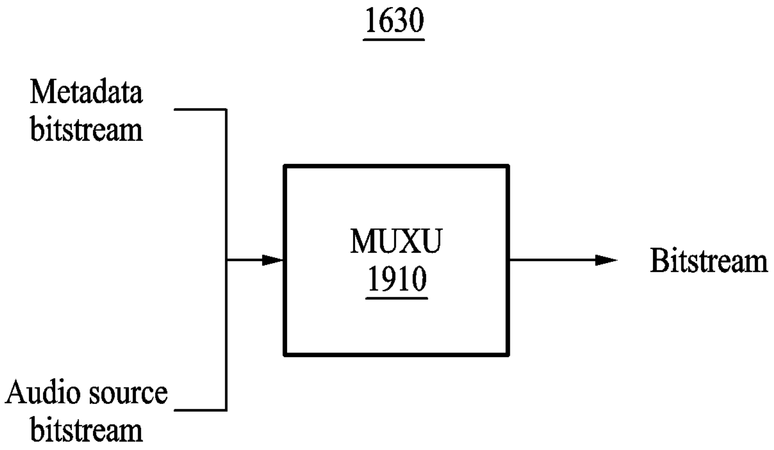
FIG. 19 is a block diagram of a muxing block of FIG. 16.

The muxing block 1630 may be configured to complete a bitstream by multiplexing the encoded spatial audio metadata output from the spatial audio metadata encoding block 1610 and the bitstream of the audio source output from the audio source encoding block 1620. Referring to FIG. 19, which is a detailed block diagram of the muxing block 1630, the muxing block 1630 may include a muxing unit (MUXU) 1910. The MUXU 1910 may be a unit configured to form a transmittable and storable bitstream by multiplexing a metadata bitstream and an audio source bitstream for spatial audio rendering. In the MPEG-I Immersive Audio standardization phase, an evaluation platform is in a structure in which all audio sources required for spatial audio rendering are directly transmitted to a renderer as encoded and decoded in advance. Thus, the MUXU 1910 may be regarded as a structure that is included only conceptually.

Figure 20:
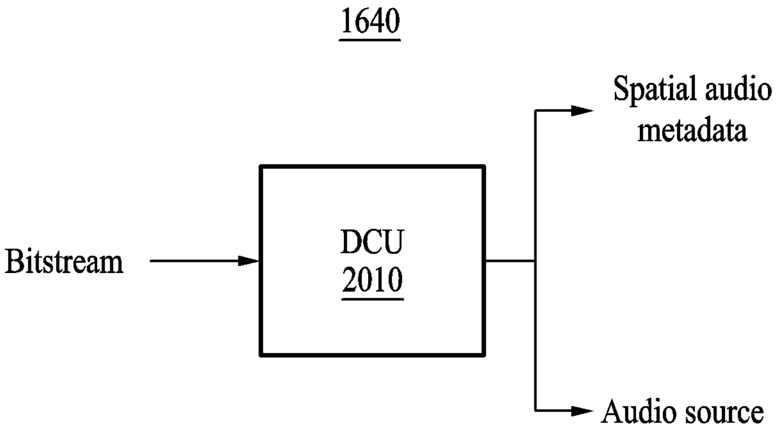
FIG. 20 is a block diagram of a decoding block of FIG. 16.

The decoding block 1640 may be configured to receive the bitstream and perform demultiplexing and decoding thereon to reconstruct and output the spatial audio metadata and the audio source. Referring to FIG. 20, which is a detailed block diagram of the decoding block 1640, the decoding block 1640 may include a decoding unit (DCU) 2010. The DCU 2010 may be configured to demultiplex the bitstream into the spatial audio metadata bitstream and the audio source bitstream and then, reconstruct and output the spatial audio metadata by decoding the spatial audio metadata bitstream and reconstruct and output the audio source by decoding the audio source bitstream. In the MPEG-I Immersive Audio standardization phase, an evaluation platform previously performs an encoding and decoding process for an audio source offline and transmits the same directly to a renderer. Thus, the DCU 2010 may be regarded as a structure that is included only conceptually.

Figure 21:
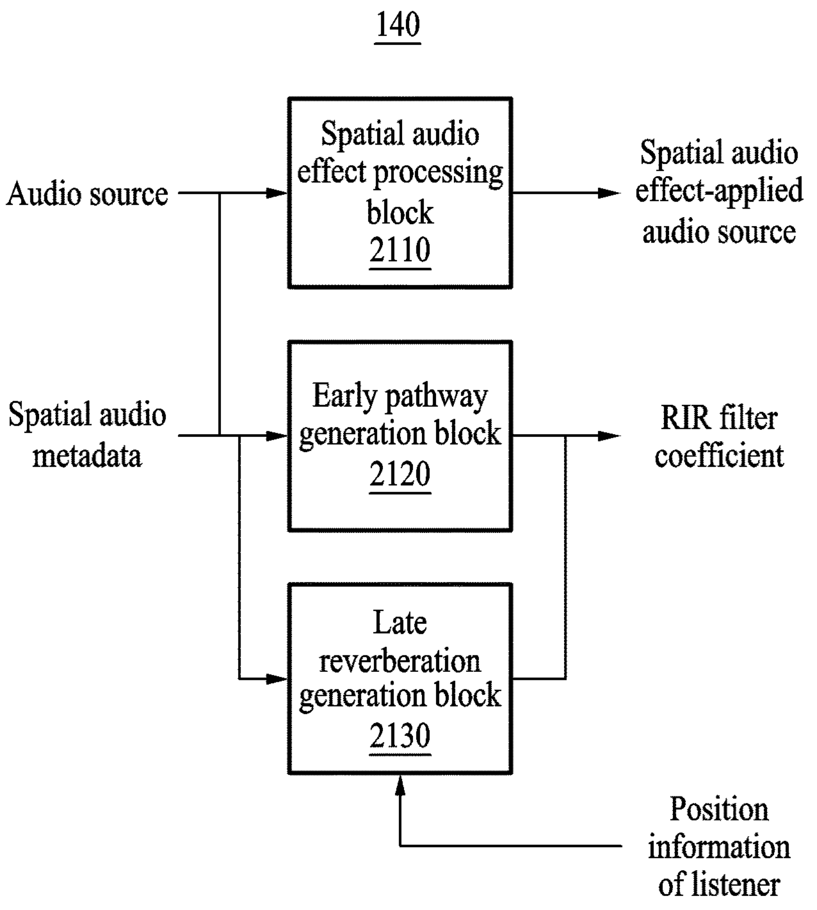
FIG. 21 is a block diagram of a spatial audio processing unit of FIG. 1.

Referring back to FIG. 1, the spatial audio processing unit 140 may be configured to synthesize and output a room impulse response (RIR) by generating a direct sound, an early reflection, scattering, diffraction, portal transfer characteristics, and a late reverberation according to an audio transfer pathway using the spatial audio parameter, and process a spatial audio effect such as the Doppler effect or a shaped audio source. Referring to FIG. 21, which is a detailed block diagram of the spatial audio processing unit 140, the spatial audio processing unit 140 may include a spatial audio effect processing block 2110, an early pathway generation block 2120, and a late reverberation generation block 2130. In FIG. 21, spatial audio metadata being input may be metadata necessary for processing spatial audio rendering, that is, audio transfer pathway generation, late reverberation generation, and spatial audio effects, and may be a dataset reconstructed from the bitstream. An audio source being input may include all frame-based audio sources reconstructed from a bitstream. Position information of a listener being output may be real-time position information of the listener measured by virtual reality equipment, and may include head center coordinates and direction information of the listener. A spatial audio effect-applied audio source being output may be an audio source obtained by applying a necessary spatial audio effect to the input audio source, and may be conceptually the same as the audio source. An RIR filter coefficient being output may be an RIR filter coefficient generated from an early audio transfer pathway and late reverberation metadata, and may be implemented as a feedback delay network (FDN) in an embodiment.

Figure 22:
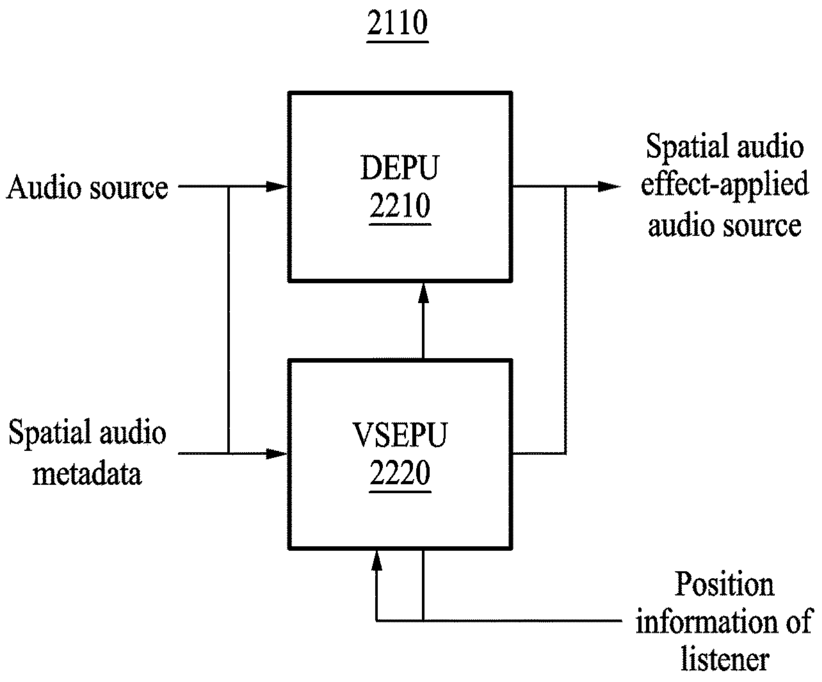
FIG. 22 is a block diagram of a spatial audio effect processing block of FIG. 21.
Figure 23:
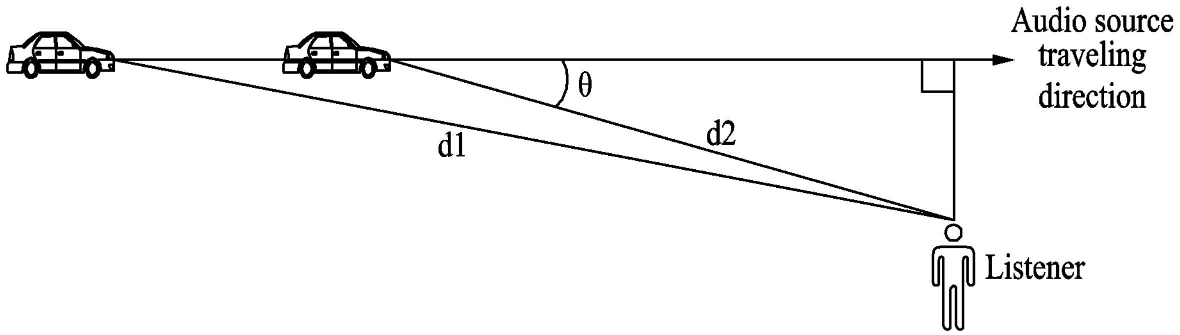
FIG. 23 is a diagram illustrating a concept of a Doppler effect.

The spatial audio effect processing block 2110 may be configured to process a spatial audio effect, such as a Doppler effect or a volume source effect, required for a variety of 6DoF spatial audio rendering in a spatial audio service. Referring to FIG. 22, which is a detailed block diagram of the spatial audio effect processing block 2110, the spatial audio effect processing block 2110 may include a Doppler effect processing unit (DEPU) 2210 and a volume source effect processing unit (VSEPU) 2220. The DEPU 2210 may be configured to process a Doppler effect by a pitch shift by compression and expansion of a sound wave by a moving audio source. As shown in FIG. 23, the Doppler effect processes the compression and expansion with respect to the speed of sound with respect to a component of a listener direction to be a pitch shift effect, from the velocity according to a displacement per unit time in the audio source traveling direction. Here, an operation for the velocity component in the direction of the listener may be extracted through approximation to a distance difference between the audio source and the listener according to the displacement per unit time. The VSEPU 2220 may be a unit configured to perform rendering by applying an effect of a volume source in which all energy is focused on one point and an audio source, other than a point audio source having a non-directional radiation pattern, has a volume and includes multiple audio sources therein, or in which a single audio source is provided and mapped to a shape having a volume, or in which a radiation pattern of an audio source is not non-directional but has a different directional pattern for each frequency band. In general, a volume source that has a shape and includes multiple audio sources is represented as a transform object in MPEG-I Immersive Audio EIF, and since each object audio source may be rendered by a typical object audio source rendering method, and thus, it may be excluded from this unit. An audio source that has a single audio source and is mapped to a shape having a volume may need to implement a diffused audio effect having size and width of energy according to the size of a shape facing the effect that the shape changes according to the position of the listener. A volume source having a directional pattern in a single audio source may be rendered by applying a directionality gain for each band according to the direction of the audio source and the position of the listener.

Figure 24:
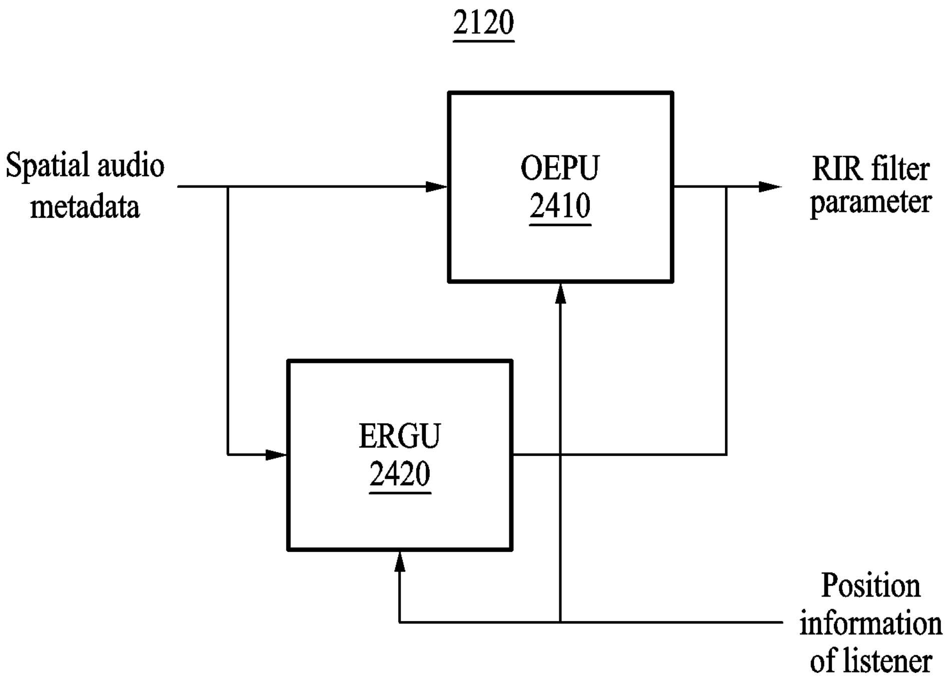
FIG. 24 is a block diagram of an early pathway generation block of FIG. 21.
Figure 25:
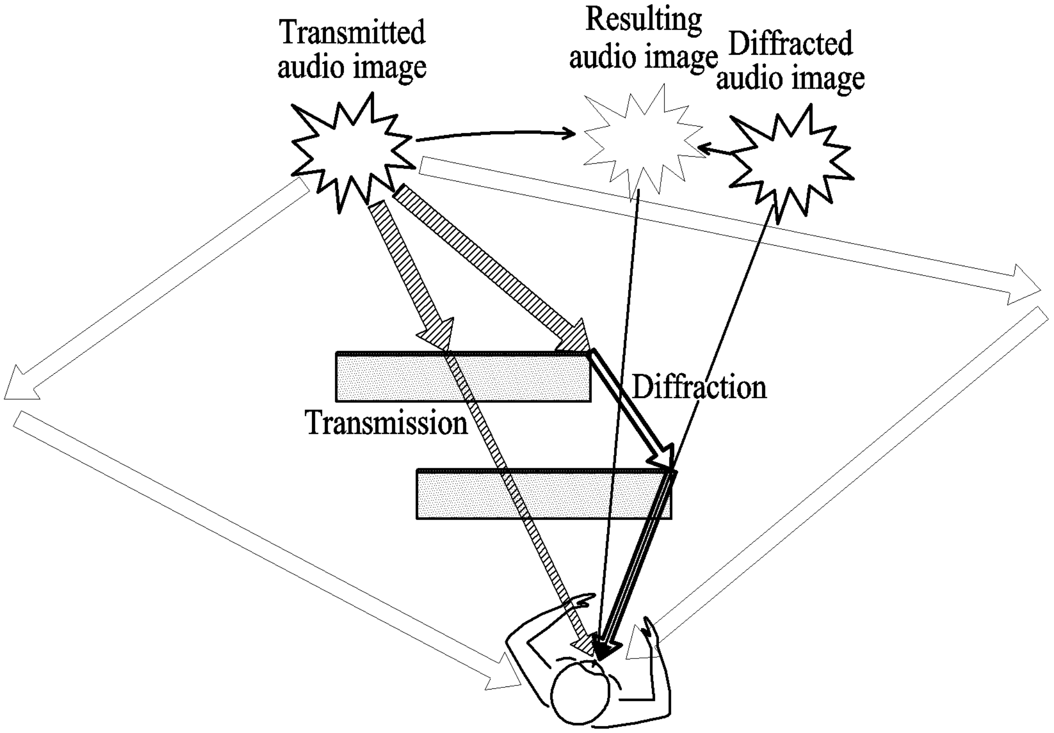
FIG. 25 is a diagram illustrating a concept of processing transmission and diffraction effects by an occlusion.

The early pathway generation block 2120 may be a block configured to extract an early RIR according to an early pathway between the audio source and the listener, that is, a pathway of a direct sound and an early reflection having an early specular reflection characteristic. Referring to FIG. 24, which is a detailed block diagram of the early pathway generation block 2120, the early pathway generation block 2120 may include an occlusion effect processing unit (OEPU) 2410 and an early reflection generation unit (ERGU) 2420. The OEPU 2410 may search for an occlusion in an occlusion structure transmitted as a bitstream on a pathway between a direct sound or an image source and a listener, apply, when an occlusion is present, a transmission loss by the occlusion, and perform, when a close diffraction pathway is present, a function of extracting two audio source transfer paths according to an audio source transfer loss by the diffraction pathway and the transmission loss and the diffraction pathway and a direction and a level of a new virtual audio source by a method such as panning according to the transferred energy. As shown in FIG. 25, when an occlusion is present on a pathway between an audio source and a listener, and a transmission loss value of the occlusion is provided, a transmitted audio source may have an attenuated audio image in the same direction, and when a diffraction pathway is present at a position close to the pathway, a diffraction characteristic by a distance difference between the diffraction pathway and a transmission pathway on an extended line of a corner where final diffraction occurs may be extracted. The direction and energy of a resulting audio image may be extracted by applying a method of panning the direction and energy of a transmitted audio image and a diffracted audio image. The ERGU 2420 may be a unit configured to generate an image source by wall, floor, and ceiling structures, transmitted as a bitstream, causing specular reflection and extract a delay and a gain according to an early reflection pathway and a reflectance. An occlusion-free reflection pathway for the position of the audio source, the provided wall surface, and the position of the listener may need to be extracted, which may be implemented by an RIR filter unit applying the delay and the gain for an early reflection, and binaural rendering may be applied by downmixing the early reflection as it is in the provided direction or with multiple channels. In an embodiment, the early reflection generating function may be processed on a frame-by-frame basis according to the listener and a reflection wall, and the movements of the audio source.

Figure 26:
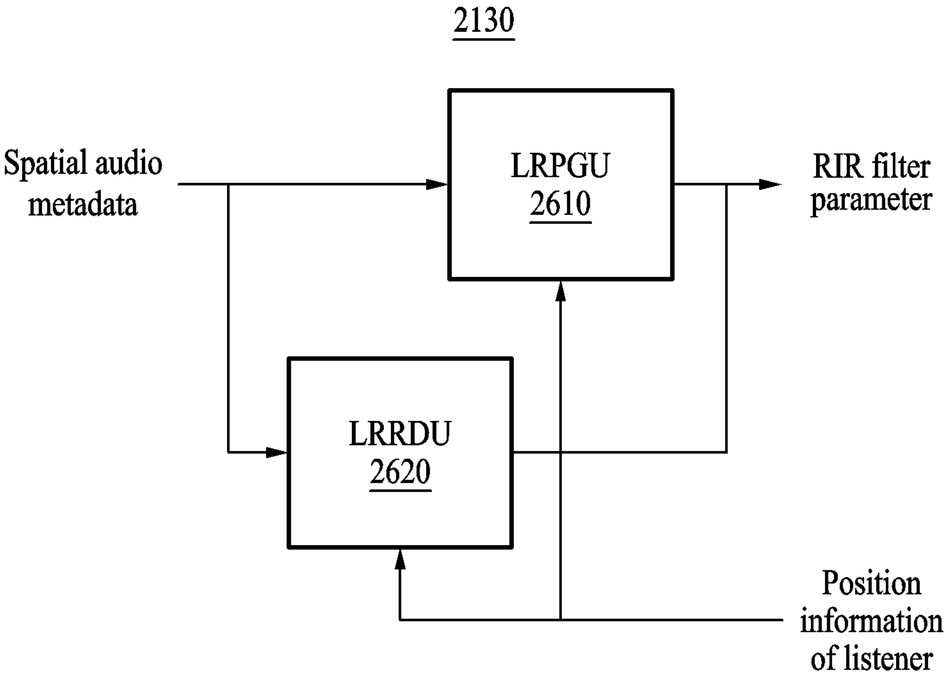
FIG. 26 is a block diagram of a late reverberation generation block of FIG. 21.

The late reverberation generation block 2130 may be a block configured to generate a late reverberation according to the position of the listener using parameters for late reverberation generation provided as a bitstream. Referring to FIG. 26, which is a detailed block diagram of the late reverberation generation block 2130, the late reverberation generation block 2130 may include a late reverberation parameter generation unit (LRPGU) 2610 and a late reverberation region decision unit (LRRDU) 2620. The LRPGU 2610 may be a unit configured to generate a late reverberation from predelay, RT60, and DDR given as a bitstream. First, since the starting point of a late reverberation is a point in time delayed by the value of predelay from a direct sound, a delay value may be set. A feedback gain may be set by the value of RT60 so as to generate a temporal attenuation slope of the late reverberation. A gain for adjusting the energy ratio of a direct sound and a late reverberation section may be set by the value of DDR. The LRRDU 2620 may be a unit configured to search to determine a region to which a current position of a listener belongs based on range information of a region to which a late reverberation parameter transmitted as a bitstream is to be applied. Since the late reverberation region is provided in a box shape, it is only necessary to determine whether the value of coordinates of the position of the listener falls between the maximum value and the minimum value of coordinates of each axial direction of the box.

Figure 27:
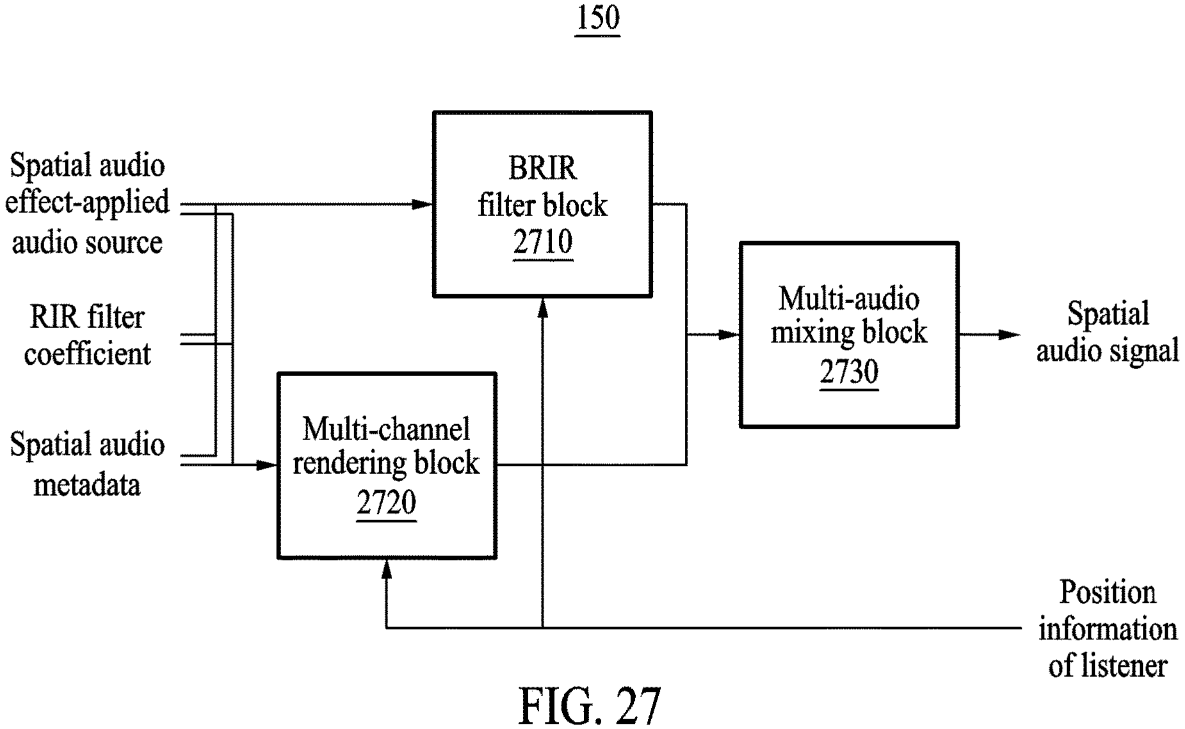
FIG. 27 is a block diagram of a spatial audio reproduction unit of FIG. 1.

Referring back to FIG. 1, the spatial audio reproduction unit 150 may be configured to generate a spatial audio at the current position of the listener by utilizing the reconstructed audio source and the RIR and then, play the spatial audio through headphones or output the spatial audio through a speaker through multi-channel rendering. Referring to FIG. 27, which is a detailed block diagram of the spatial audio reproduction unit 150, the spatial audio reproduction unit 150 may include a BRIR filter block 2710, a multi-channel rendering block 2720, and a multi-audio mixing block 2730. Here, a spatial audio effect-applied audio source being input may be an audio source to which a spatial audio effect such as a Doppler effect is applied, or may be an audio source to which a spatial audio effect is not applied according to a condition such as a movement or a shape of the audio source. An RIR filter coefficient being input may be an RIR filter coefficient generated from an early audio transfer pathway and late reverberation metadata, and may also be implemented as an FDN in the development phase. Spatial audio metadata being input may be metadata necessary for processing spatial audio rendering, that is, audio transfer pathway generation, late reverberation generation, and spatial audio effects, and may be a dataset reconstructed from the bitstream. Position information of a listener being input may be real-time position information of the listener measured by virtual reality equipment, and may be head center coordinates and direction information of the listener. A spatial audio signal being output may be a stereo audio signal played through headphones or/and a multi-channel speaker.

Figure 28:
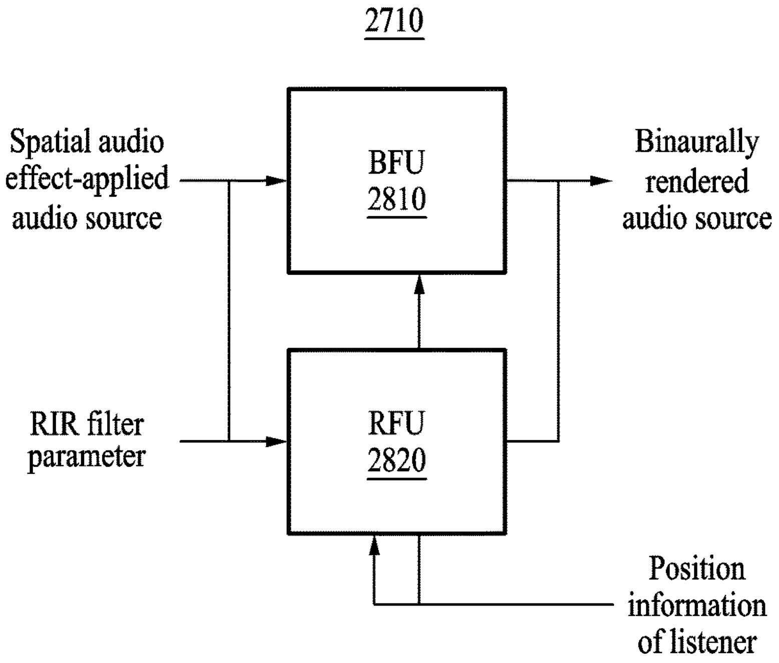
FIG. 28 is a block diagram of a binaural room impulse response (BRIR) filter block of FIG. 27.

The BRIR filter block 2710 may be a block configured to apply a binaural filter and an RIR filter according to the direction of the audio source of the direct sound and the delay and attenuation values of the early reflection/late reverberation extracted by the early pathway generation block 2120 and the late reverberation generation block 2130 of the spatial audio processing unit 140. Referring to FIG. 28, which is a detailed block diagram of the BRIR filter block 2710, the BRIR filter block 2710 may include a binaural filter unit (BFU) 2810 and an RIR filter unit (RFU) 2820. The BFU 2810 may be a filter unit configured to convert the direction of a directional audio source to a binaural stereo audio using a head-related transfer function (HRTF). A delay and a gain may need to be applied together according to a pathway between the audio source and the position of the listener, and when an early reflection and a late reverberation generated by the RFU 2820 is multi-channel, filtering may be performed by applying HRTF in a predetermined direction for a virtual speaker effect. The RFU 2820 may be a unit configured to generate an impulse response by controlling a delay and a gain of each impulse generated by the ERGU 2420 and the LRPGU 2610, and may be implemented through a pre-designed FDN along with a feedback gain for generating a temporal attenuation pattern of a late reverberation.

Figure 29:
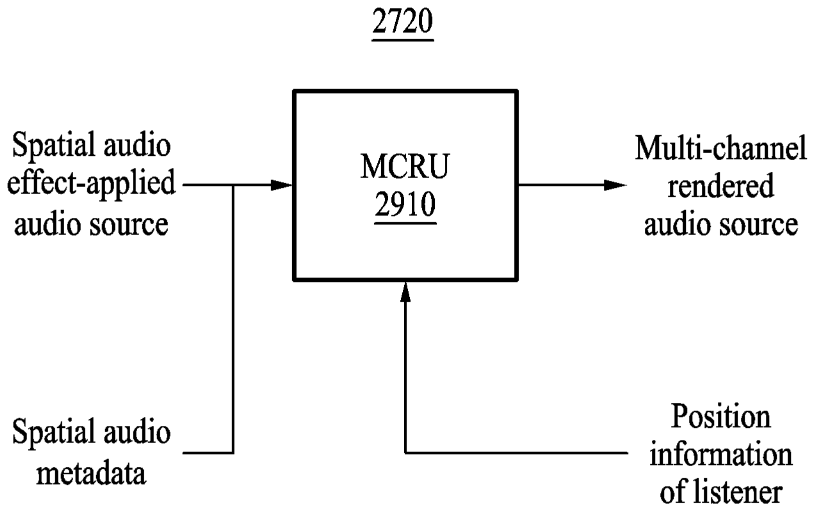
FIG. 29 is a block diagram of a multi-channel rendering block of FIG. 27.

The multi-channel rendering block 2720 may be a block configured to generate a channel signal in the form of a predetermined channel through which an audio source to be played through a multi-channel speaker is to be played. Referring to FIG. 29, which is a detailed block diagram of the multi-channel rendering block 2720, the multi-channel rendering block 2720 may include a multi-channel rendering unit (MCRU) 2910. The MCRU 2910 may be a unit configured to perform, for spatial audio sources being input, multi-channel rendering necessary for a multi-channel speaker environment provided in a listening environment according to spatial audio metadata, and may perform multi-channel panning such as vector based amplitude panning (VBAP) for an object audio source and perform channel format conversion for a multi-channel audio source and a scene-based audio source, depending on the type of audio source being input.

Figure 30:
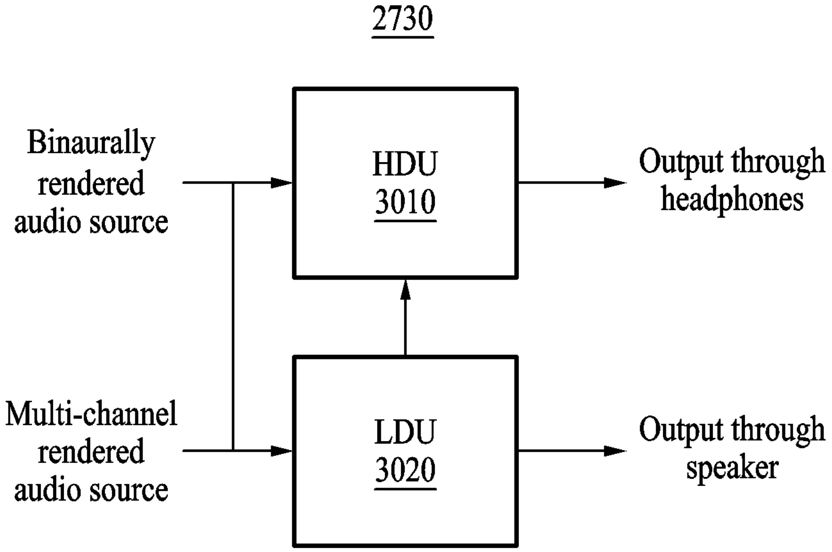
FIG. 30 is a block diagram of a multi-audio mixing block of FIG. 27.

The multi-audio mixing block 2730 may appropriately classify and control a binaurally rendered audio source and a multi-channel rendered audio source to be output through headphones or a speaker, and to be played using a method selected from a method of playing through headphones only, a method of playing through a speaker only, and a method of playing using both headphones and a speaker, depending on the play type. Referring to FIG. 30, which is a detailed block diagram of the multi-audio mixing block 2730, the multi-audio mixing block 2730 may include a headphone driver unit (HDU) 3010 and a loudspeaker driver unit (LDU) 3020. The HDU 3010 may play a stereo audio by outputting the binaurally rendered audio source as it is, and may optionally play only an audio source to be played through headphones in the method of playing through both headphones and a speaker. In addition, when an audio source played through a speaker approaches, a component to be played through the speaker and a component to be played through the headphones may be classified and separately played. That is, when an audio source such as a propeller approaches, an effect of enhancing the low band of the approaching audio source and an effect from air pressure such as wind noise may be separately generated and played. In this case, a gain and a frequency response for balancing with the speaker play may be adjusted. The LDU 3020 may play a stereo audio by outputting the multi-channel rendered audio source as it is, and may optionally play only an audio source to be played through a speaker in the method of playing through both headphones and a speaker. Further, when the audio source having approached moves away, the audio source played through the headphones may change to be played through the speaker, and such change may be made gradually according to the distance to minimize distortion that may occur at the point in time of change. In addition, when a listener listens to an audio played through a speaker while wearing headphones, the audio played through the speaker may be compensated to eliminate the effect that the speaker audio is shielded.

As described above, according to embodiments of the disclosure, it is possible to generate a parameter necessary for immersive spatial audio rendering as a bitstream by modeling an immersive spatial audio in a 6DOF environment where a listener may move at freedom, and a terminal may generate a 3D audio in real time and provide the 3D audio to a moving user using the immersive spatial audio rendering parameter transmitted as a bitstream. If it is unnecessary to transmit/process entire audio data and metadata intended by a content producer in a device for performing immersive spatial audio rendering, a method for efficient transmission and processing of the same may be provided. Further, by optionally transmitting audio data and corresponding metadata necessary for the content transmission phase by referring to position information of a user, the quality of content intended by the producer may be guaranteed even in smaller transmission bandwidth.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An apparatus for immersive spatial audio modeling and rendering, the apparatus comprising:

an acoustical space model representation unit configured to output a spatial audio model in response to receiving a visual space model and a spatial audio parameter;

a spatial audio modeling unit configured to analyze a spatial audio scene and output a spatial audio parameter in response to receiving the spatial audio model from the acoustical space model representation unit;

a spatial audio codec unit configured to generate a bitstream by encoding an audio source required for spatial audio rendering and the spatial audio parameter output from the spatial audio modeling unit and then transmit the generated bitstream, and perform a function of reconstructing the audio source and the spatial audio parameter by receiving and parsing the transmitted bitstream so as to render a spatial audio in real time;

a spatial audio processing unit configured to synthesize and output a room impulse response (RIR) by generating a direct sound, an early reflection, and a late reverberation according to an audio transfer pathway in response to receiving information on a position of a listener and the spatial audio parameter received from the spatial audio codec unit; and a spatial audio reproduction unit configured to generate a spatial audio at the position of the listener and then reproduce the generated spatial audio in response to receiving the information on the position of the listener and the RIR from the spatial audio processing unit.

2. The apparatus of claim 1, wherein the acoustical space model representation unit comprises a space model simplification block, and the space model simplification block is configured to output an acoustical space model having a simple structure obtained by extracting only forms that produce an auditorily significant audio effect in response to the visual space model.

3. The apparatus of claim 2, wherein the space model simplification block comprises:

a space model hierarchical analysis unit (SMHAU) configured to perform a function of constructing a binary space partitioning (BSP) tree by hierarchically analyzing geometric data constituting a space model;

a space model simplification unit (SMSU) configured to simplify a space model to a level required for producing an acoustical effect based on the BSP tree; and an acoustical space model generation unit (ASMGU) configured to represent a mesh of the simplified space model with units of triangular faces.

4. The apparatus of claim 3, wherein the acoustical space model representation unit further comprises a spatial audio model generation block, and the spatial audio model generation block is configured to, in response to receiving the spatial audio parameter, compose an entire scene of spatial audio content and generate and output the spatial audio model.

5. The apparatus of claim 1, wherein the spatial audio modeling unit comprises:

a hierarchical space model block configured to hierarchically analyze a structure of an acoustical space model of the spatial audio model;

an audio transfer pathway model block configured to extract a parameter of an occlusion on an audio pathway between an audio source and a listener and a parameter of an early reflection, in an acoustical space model of the spatial audio model;

a late reverberation model block configured to classify a region that uses the same late reverberation model based on the acoustical space model of the spatial audio model, and extract parameters representing energy of a late reverberation and an attenuation slope; and a spatial audio effect model block configured to extract a parameter for a spatial audio effect model required for six degrees of freedom (6DoF) spatial audio rendering.

6. The apparatus of claim 5, wherein the audio transfer pathway model block comprises:

an occlusion modeling unit (OMU) configured to perform a function of defining an occlusion for an effect in which a direct sound of an audio source is indirectly transferred by the occlusion; and an early reflection modeling unit (ERMU) configured to generate a parameter for modeling primary or up to secondary early reflection from an audio source to a listener.

7. The apparatus of claim 5, wherein the late reverberation model block comprises:

a late reverberation area analysis unit (LRAAU) configured to define a classified area for a renderer to generate a late reverberation component according to the position of the listener; and a late reverberation parameter extraction unit (LRPEU) configured to extract a parameter necessary for generating a late reverberation.

8. The apparatus of claim 5, wherein the spatial audio effect model block comprises:

a Doppler parameter extraction unit (DPEU) configured to extract a parameter for implementing a pitch shift phenomenon according to a velocity of an audio source; and a volume source parameter extraction unit (VSPEU) configured to transfer, for an audio source having a shape, geometric information of the shape as a parameter.

9. The apparatus of claim 8, wherein the DPEU is further configured to, when movement properties of the audio source are preset, set a parameter regarding whether to process a Doppler effect by a maximum velocity value, and apply a Doppler effect in advance for an audio source that is far or invisible from a region to which the listener can move.

10. The apparatus of claim 1, wherein the spatial audio codec unit comprises:

a spatial audio metadata encoding block configured to quantize spatial audio metadata and pack the quantized spatial audio metadata in a metadata bitstream;

an audio source encoding block configured to compress and encode an audio source;

a muxing block configured to construct a multiplexed bitstream by multiplexing the encoded spatial audio metadata output from the spatial audio metadata encoding block and the bitstream of the audio source output from the audio source encoding block; and a decoding block configured to receive the multiplexed bitstream and perform demultiplexing and decoding thereon to reconstruct and output the spatial audio metadata and the audio source.

11. The apparatus of claim 1, wherein the spatial audio processing unit comprises:

a spatial audio effect processing block configured to process a spatial audio effect required for 6DoF spatial audio rendering;

an early pathway generation block configured to extract an early RIR according to an early pathway between an audio source and the listener; and a late reverberation generation block configured to generate a late reverberation according to the position of the listener using parameters for late reverberation generation.

12. The apparatus of claim 11, wherein the spatial audio effect processing block comprises:

a Doppler effect processing unit (DEPU) configured to process a Doppler effect by a pitch shift by compression and expansion of a sound wave by a moving audio source; and a volume source effect processing unit (VSEPU) configured to perform rendering by applying an effect of a volume source in which all energy is focused on one point and an audio source has a volume and comprises multiple audio sources therein, or in which a single audio source is provided and mapped to a shape having a volume, or in which a radiation pattern of an audio source has a different directional pattern for each frequency band.

13. The apparatus of claim 11, wherein the early pathway generation block comprises:

an occlusion effect processing unit (OEPU) configured to search for an occlusion in an occlusion structure transmitted as a bitstream on a pathway between a direct sound or an image source and the listener, apply, when an occlusion is present, a transmission loss by the occlusion, and perform, when a close diffraction pathway is present, a function of extracting two audio source transfer paths according to an audio source transfer loss by the diffraction pathway and the transmission loss and the diffraction pathway and a direction and a level of a new virtual audio source according to the transferred energy; and an early reflection generation unit (ERGU) configured to generate an image source by a structure, transmitted as a bitstream, causing specular reflection and extract a delay and a gain according to an early reflection pathway and a reflectance.

14. The apparatus of claim 11, wherein the late reverberation generation block comprises:

a late reverberation parameter generation unit (LRPGU) configured to generate a late reverberation from predelay, RT60, and DDR provided as a bitstream; and a late reverberation region decision unit (LRRDU) configured to search to determine a region to which a current position of a listener belongs based on range information of a region to which a late reverberation parameter transmitted as a bitstream is to be applied.

15. The apparatus of claim 11, wherein the spatial audio reproduction unit is further configured to play the generated spatial audio through headphones or output the generated spatial audio through a speaker through multi-channel rendering.

16. The apparatus of claim 15, wherein the spatial audio reproduction unit comprises:

a binaural room impulse response (BRIR) filter block configured to apply a binaural filter and an RIR filter according to the direction of the audio source of the direct sound and the delay and attenuation values of the early reflection/late reverberation extracted by the early pathway generation block and the late reverberation generation block of the spatial audio processing unit;

a multi-channel rendering block configured to generate a channel signal in the form of a predetermined channel through which an audio source to be played through a multi-channel speaker is to be played; and a multi-audio mixing block configured to classify and control a binaurally rendered audio source and a multichannel rendered audio source to be output through headphones or a speaker.

* * * * *